US009152720B2

(12) United States Patent
Krakirian et al.

(10) Patent No.: US 9,152,720 B2
(45) Date of Patent: *Oct. 6, 2015

(54) SEARCH ENGINE FOR A VIDEO RECORDER

(71) Applicant: Rovi Guides, Inc., Santa Clara, CA (US)

(72) Inventors: Haig H. Krakirian, Burbank, CA (US); Geoffrey Z. Ombao, Pacific Palisades, CA (US); James A. Bumgardner, Shadow Hills, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/244,268

(22) Filed: Apr. 3, 2014

(65) Prior Publication Data

US 2014/0304248 A1    Oct. 9, 2014

Related U.S. Application Data

(63) Continuation of application No. 13/159,089, filed on Jun. 13, 2011, now Pat. No. 8,732,152, which is a continuation of application No. 10/905,489, filed on Jan. 6, 2005, now Pat. No. 7,974,962.

(51) Int. Cl.
*G06F 17/30* (2006.01)
*H04N 5/445* (2011.01)
*H04N 5/782* (2006.01)
*H04N 21/4147* (2011.01)
*H04N 21/432* (2011.01)
*H04N 21/433* (2011.01)
*H04N 21/472* (2011.01)
(Continued)

(52) U.S. Cl.
CPC ...... *G06F 17/30864* (2013.01); *H04N 5/44543* (2013.01); *H04N 5/782* (2013.01); *H04N 21/4147* (2013.01); *H04N 21/4325* (2013.01); *H04N 21/4333* (2013.01); *H04N 21/47202* (2013.01); *H04N 21/47214* (2013.01); *H04N 21/482* (2013.01); *H04N 21/4828* (2013.01); *H04N 21/8405* (2013.01)

(58) Field of Classification Search
USPC .......................... 707/706; 725/39, 43, 56, 61
See application file for complete search history.

(56) References Cited

U.S. PATENT DOCUMENTS 4,706,121 A    11/1987  Young
5,008,810 A     4/1991  Kessel et al.
(Continued)

FOREIGN PATENT DOCUMENTS

EP         0806112      11/1997
JP         2003-533139  11/2003

*Primary Examiner* — Hanh Thai
(74) *Attorney, Agent, or Firm* — Ropes & Gray LLP

(57) ABSTRACT

The present invention is directed to a search engine for a video recorder. One embodiment of the present invention operates in an environment that includes one or more set-top boxes connected to or integrated within one or more output devices. The set-top boxes are used to transfer shows from a broadcast input source to one or more types of storage devices and to play back the shows from the storage devices to the output devices, either in a delayed-live fashion or at a later time of the user's choosing. The set-top box displays a graphical user interface (GUI), which gives the user the ability to watch and/or record timeslot based programming, to order on-demand programming, and to playback previously recorded shows that reside on a local or remote storage device. A search engine is added to the GUI that lets the search for shows and receive results in an enhanced manner.

20 Claims, 21 Drawing Sheets

(51) Int. Cl.
*H04N 21/482* (2011.01)
*H04N 21/8405* (2011.01)

(56) References Cited

U.S. PATENT DOCUMENTS

| | | |
|---|---|---|
| 5,479,266 A | 12/1995 | Young et al. |
| 5,479,268 A | 12/1995 | Young et al. |
| 5,479,892 A | 1/1996 | Edwards |
| 5,629,733 A | 5/1997 | Youman et al. |
| 5,801,787 A | 9/1998 | Schein et al. |
| 5,850,218 A | 12/1998 | LaJoie et al. |
| 5,880,768 A | 3/1999 | Lemmons et al. |
| 6,005,565 A | 12/1999 | Legall et al. |
| 6,049,333 A | 4/2000 | LaJoie et al. |
| 6,133,909 A | 10/2000 | Schein et al. |
| 6,144,401 A | 11/2000 | Casement et al. |
| 6,388,714 B1 | 5/2002 | Schein et al. |
| 6,516,329 B1 | 2/2003 | Smith |
| 6,760,537 B2 | 7/2004 | Mankovitz |
| 6,760,918 B2 | 7/2004 | Rodriguez et al. |
| 6,981,273 B1 | 12/2005 | Domegan et al. |
| 6,990,495 B1 * | 1/2006 | Grason et al. ............. 1/1 |
| 7,174,512 B2 | 2/2007 | Martin et al. |
| 7,228,556 B2 | 6/2007 | Beach et al. |
| 7,228,856 B2 | 6/2007 | Aoyagi |
| 7,673,319 B1 | 3/2010 | Hendricks et al. |
| 2001/0029610 A1 | 10/2001 | Corvin et al. |
| 2002/0023262 A1 | 2/2002 | Porter |
| 2002/0129366 A1 | 9/2002 | Schein et al. |
| 2002/0174430 A1 | 11/2002 | Ellis et al. |
| 2002/0199192 A1 | 12/2002 | Donnelly |
| 2003/0028884 A1 | 2/2003 | Swart et al. |
| 2003/0079227 A1 | 4/2003 | Knowles et al. |
| 2003/0105637 A1 | 6/2003 | Rodriguez et al. |
| 2003/0233656 A1 | 12/2003 | Sie et al. |
| 2004/0044677 A1 | 3/2004 | Huper-Graff et al. |
| 2004/0117831 A1 | 6/2004 | Ellis et al. |
| 2004/0123319 A1 | 6/2004 | Kim |
| 2004/0175121 A1 | 9/2004 | Ellis et al. |
| 2004/0216156 A1 | 10/2004 | Wagner |
| 2004/0261098 A1 | 12/2004 | Macrae et al. |
| 2004/0268250 A1 | 12/2004 | Danker et al. |
| 2005/0028218 A1 | 2/2005 | Blake |
| 2005/0105881 A1 | 5/2005 | Mankovitz |
| 2005/0235319 A1 | 10/2005 | Carpenter et al. |
| 2006/0026641 A1 | 2/2006 | Jule et al. |
| 2006/0053470 A1 | 3/2006 | Colter et al. |
| 2006/0095937 A1 | 5/2006 | Knudson et al. |
| 2007/0214126 A1 | 9/2007 | Kikinis |
| 2008/0188213 A1 | 8/2008 | Mankovitz |
| 2011/0239250 A1 | 9/2011 | Krakirian et al. |
| 2013/0103712 A1 * | 4/2013 | Li et al. ............. 707/769 |

* cited by examiner

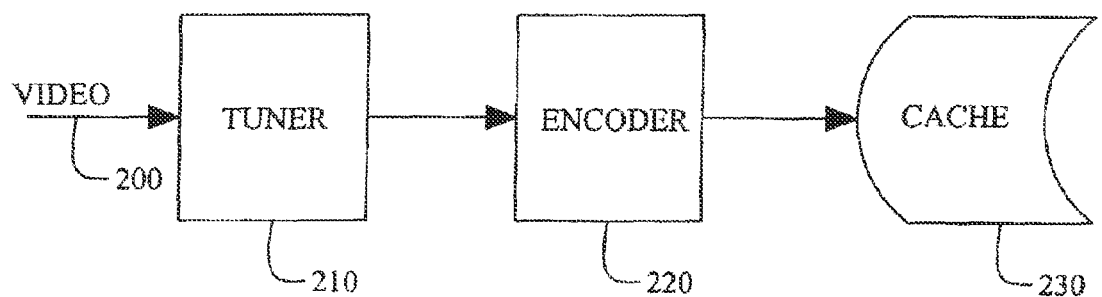
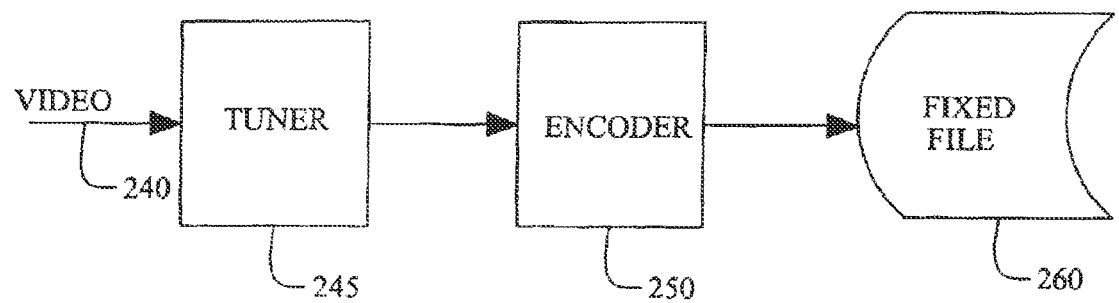
FIG. 2

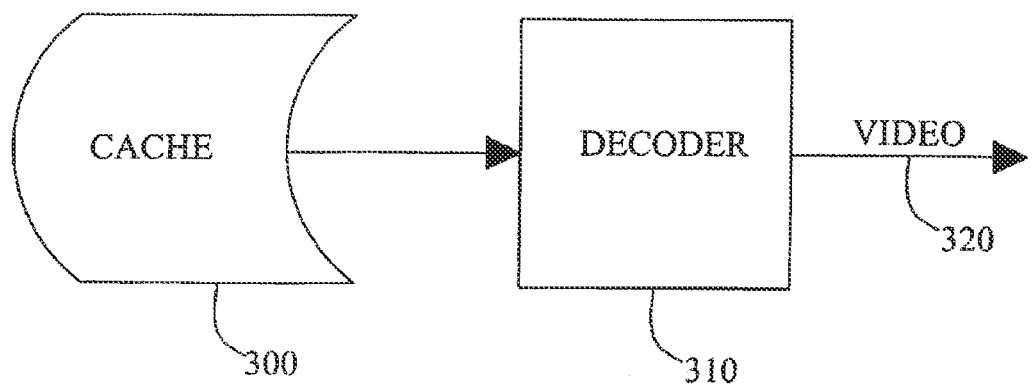
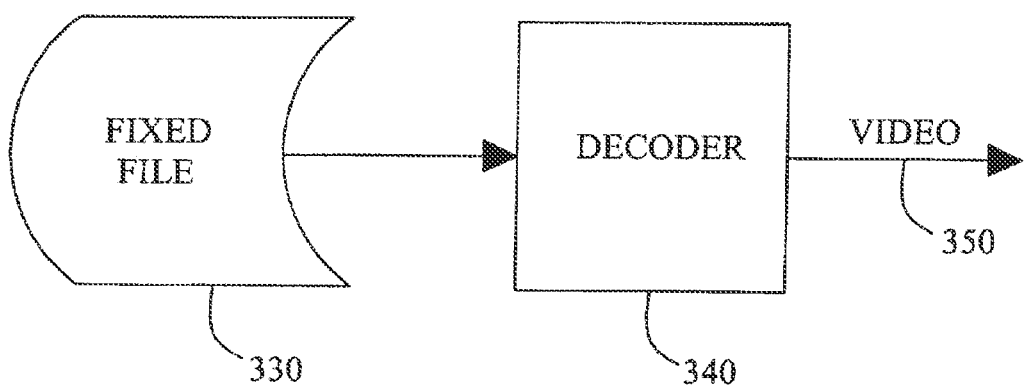
FIG. 3

SEARCH ENGINE FOR A VIDEO RECORDER

CROSS REFERENCE TO RELATED APPLICATIONS

This application is a continuation of prior U.S. patent application Ser. No. 13/159,089, filed on Jun. 13, 2011 (currently allowed); which is a continuation of prior U.S. patent application Ser. No. 10/905,489 (now U.S. Pat. No. 7,974,962) filed on Jan. 6, 2005, all of which are hereby incorporated by reference herein in their entirety.

NOTICE OF MATERIAL SUBJECT TO COPYRIGHT PROTECTION

All of the material in this patent document is subject to copyright protection under the copyright laws of the United States and of other countries. The owner of the copyright has no objection to the facsimile reproduction by anyone of the patent document or the patent disclosure, as it appears in the United States Patent and Trademark Office file or records, but otherwise reserves all copyrights whatsoever.

BACKGROUND OF THE INVENTION

1. Field of the Invention

The present invention relates generally to search engines, and more particularly to a search engine for a video recorder system that has enhanced presentation and searching capabilities.

2. Background of the Invention

Video recorders are devices that are used in conjunction with a television set to enhance the user's entertainment experience. A user watches an output device, such as a television set, while the video recorder, which is either attached to or incorporated within the output device, is used for such things, for example, as tuning to particular stations, recording the shows, playing back previously recorded shows, and searching for shows to watch now or schedule for recording later.

In the past, a user searched for shows using a magazine such as "TV Guide". The user would scan through the pages of the magazine until the appropriate show was located and then would manually tune their television to that channel. More recently, a program guide was provided with analog cable. Instead of a magazine, a specific channel was dedicated to the program guide and similar to a magazine, pages of the program guide were displayed on the screen and the user watched the pages on the screen to find a show that the user could then tune to or schedule to record.

As digital cable became more common, a more interactive program guide (IPG) was provided. While not only displaying pages similar to a magazine, the user was able to provide input and actively search for shows, rather than passively wait for the appropriate page to appear on the screen. For instance, the user could move forward in time to see shows in the future and the user could move between channels as well. IPGs also gave the user the ability to select shows automatically for tuning or recording by providing input to the IPG.

Magazine and IPG searches are "timeslot based" meaning one can find shows based on the show's timeslot. If the show airs at 9:00 AM every Sunday, then the show is found in the magazine under the 9:00 AM timeslot on Sunday and likewise in the IPG. This creates a problem because oftentimes two or more entries of interest to a user are located a great distance apart spatially in a timeslot based grid. Take for example a user who wants to consider all shows where one of the characters is "Big Bird". Such entries might be located, for instance, Monday through Friday at 10:00 AM on channel 5 when the show "Sesame Street" is aired, as well as on Sunday at 5:00 PM on channel 33, when "Sesame Street the Movie" is aired. In such a case, the only way the user could discover all of these entries is to scan through the entire timeslot based program guide for the entire week examining every entry. From the user's perspective, this is a problematic and overly time-consuming method of searching for shows.

SUMMARY OF THE INVENTION

The present invention is directed to a search engine for a video recorder having enhanced search and presentation capabilities. One embodiment of the present invention operates in an environment that includes one or more set-top boxes connected to or integrated within one or more output devices. The set-top boxes are used to transfer shows from a broadcast input source to one or more types of storage devices (e.g., hard drives) and to play back the shows from the storage devices to the output devices, either in a delayed-live fashion or at a later time of the user's choosing. The set-top box displays a graphical user interface (GUI), which gives the user the ability to watch and/or record timeslot based programming, to order on-demand programming, and to playback previously recorded shows that reside on a local or remote storage device.

A search engine is included in the GUI. In one embodiment, the search engine comprises an on-screen, alpha-numeric interface area that lets the user select letters or numbers using an input device such as a remote control. As the user selects letters or numbers, the system interfaces with one or more databases to locate entries that have a possibility of being matches with the user's initial selection from the alpha-numeric interface area. As the user proceeds to select more letters or numbers, the system continues using the database to narrow the potential results to output to the screen. In one embodiment, the alpha-numeric interface area is modified after each selection by making invalid letters and numbers inaccessible to the user, for instance by making it unselectable.

In another embodiment, the search engine comprises a keyword search engine. First, the user types in a keyword in an input field area. The system examines the first letter of the keyword and uses the database to find possible matches. The system then continues by examining the second and subsequent letters entered into the input field area until appropriate results are obtained.

In one embodiment, the results are organized using categories. For instance, results may be obtained by creating folders of all shows where a certain actor or actress appears, where their name matches the selections by the user. Alternatively, matching shows may be listed by show title, show type, or other appropriate category. Identical instances of the same show that are aired at different times or on different channels may be displayed as a single folder on-screen which allows the user to open the folder to find the instance of the show most appropriate to them. Once a result is found by the user, they may view the show, find out more information about the show, record the show, or schedule the show to be recorded later.

In one embodiment, the search engine utilizes a common key that is used as the basis for a search of three separate types of databases. The first type of database comprises data relating to timeslot based programming, the second type of database comprises data related to on-demand programming, the third type of database comprises data related to previously recorded shows that are available to the set-top box in use.

The common key is used to query each database to find database entries that match the key. Such keys are then used to output a list of results that match the search from all three databases. In one embodiment, the search engine utilizes such factors, for instance, as title, category (e.g., horror or comedy), time, actors, etc.

BRIEF DESCRIPTION OF THE DRAWINGS

The invention will be more fully understood by reference to the following drawings, which are for illustrative purposes only:

FIG. 2 is a diagram of a configuration for one of the multiple tuners associated with the video recorder, FIG. 3 shows a configuration for a single decoder.

DETAILED DESCRIPTION OF THE INVENTION

The present invention is directed to a search engine for a video recorder that has enhanced output and search capabilities. A video recorder as used herein refers to a device capable of transferring broadcast signals and stored content to an output device, transferring broadcast signals to a storage device (e.g., hard drive), and retrieving the broadcast signals from the storage device. The terms video recorder, personal video recorder (PVR), and digital video recorder (DVR) are used herein interchangeably. Referring more specifically to the drawings, for illustrative purposes an embodiment of a video recorder is shown in the functional block diagram of FIG. 1.

Figure 1:
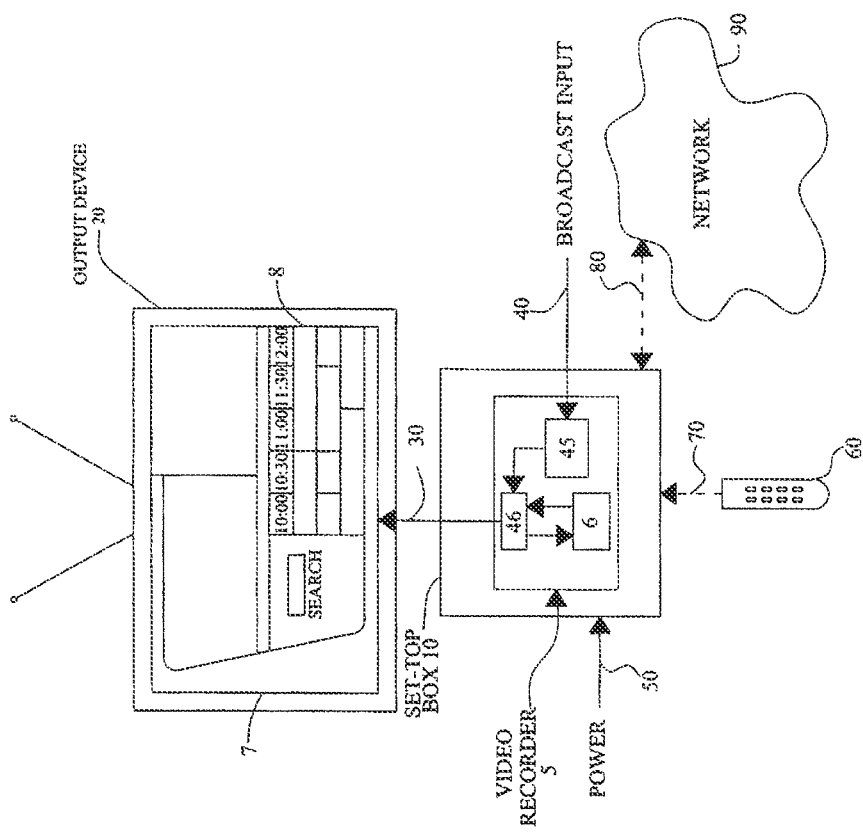
FIG. 1 is a functional block diagram of an embodiment of a set-top box.

A video recorder 5 is an internal or external component of a set-top box 10. The video recorder 5 includes some or all of a combination of software, hardware, and firmware. In one embodiment, the video recorder 5 uses a storage device 6, such as a hard drive that is internal or external to the set-top box 10 where shows are saved. The set-top box 10 connects to an output device 20, which facilitates the use of broadcast signals, such as live television signals, video on demand broadcasts, downloads of Internet content, viewing of web pages, and viewing of content previously transferred to the storage device 6. In the example of FIG. 1, set-top box 10 is shown as being external to output device 20. It should be understood by someone having ordinary skill in the art, that set-top box 10 may be internal to output device 20 as well.

A GUI 7 that includes an IPG 8 is provided, which is displayed on the output device 20. GUI 7 in conjunction with IPG 8 allows the user to control the video recorder 5, typically using a remote control 60. For instance, the user may search the IPG 8 and select shows which are then scheduled to be transferred to storage device 6. The software or firmware that controls set-top box 10 may be installed locally or it may be downloaded from the Internet as needed when configuring new set-top boxes or when updating existing ones.

Set-top box 10 is connected to output device 20 via a transmission line 30. Broadcast signals are received by the set-top box 10 via broadcast input source 40, which may be connected to either an antenna, cable television outlet, or other suitable input source. One or more tuner systems 45 are configured to allow the system to utilize broadcast signals from multiple channels. The video recorder component 5 includes a storage device 6 in conjunction with a volatile memory 46, such as a Random Access Memory (RAM). Typically, the broadcast input received along line 40 is handled by the tuner 45. The signal is temporarily resident in memory 46 using a circular buffer or other cache before being transferred more or less permanently to storage device 6. The tuner system 45 works in conjunction with the storage device 6 so that for each tuner in the system, each can simultaneously transfer broadcast signals to the storage device 6, or display channels up to the given number of tuners on output device 20.

Set-top box 10 receives power through a line 50. Set-top box 10 receives user input entered from a handheld remote control 60 over a wireless link 70. Wireless link 70 may be an infrared (IR) link, a radio frequency (RF) link, or any other suitable type of link. A bi-directional data path 80 is provided to set-top box 10, through which set-top box 10 can access a network 90, either local, global, or both. Transmission line 40 may provide data from a variety of input sources including cable, satellite, or electro-magnetic waves.

In one embodiment of the present invention, the PVR uses multiple tuners. Each of the tuners is normally associated with one encoder and one cache, which may be a fixed or variable size cache (for a live signal) or a fixed file in the case where the incoming signal is merely transferred to the storage device 6. FIG. 2 shows various configurations for one of the multiple tuners associated with the PVR. Video stream 200 is provided to tuner 210, which passes the signal to encoder 220, which transfers the data in a cache 230. This configuration is used for analog use of a live TV signal.

An alternate configuration includes a video stream 240, which is then provided to tuner 245, which is then passed to encoder 250 and then to fixed file block 260. This configuration is useful for the analog transfer of a signal. For digital channels, encoder blocks 220 and 250 are removed, since the signal has already been digitized.

FIG. 3 shows a configuration for a single decoder. Cache 300 provides data to decoder 310, which outputs video signal 320. This arrangement is useful for watching live TV. Alternatively, fixed file block 330 provides data to decoder 340, which outputs a video signal 350. This embodiment is useful for playing back a show that has already been transferred to the storage device (e.g., hard drive).

Figure 4:
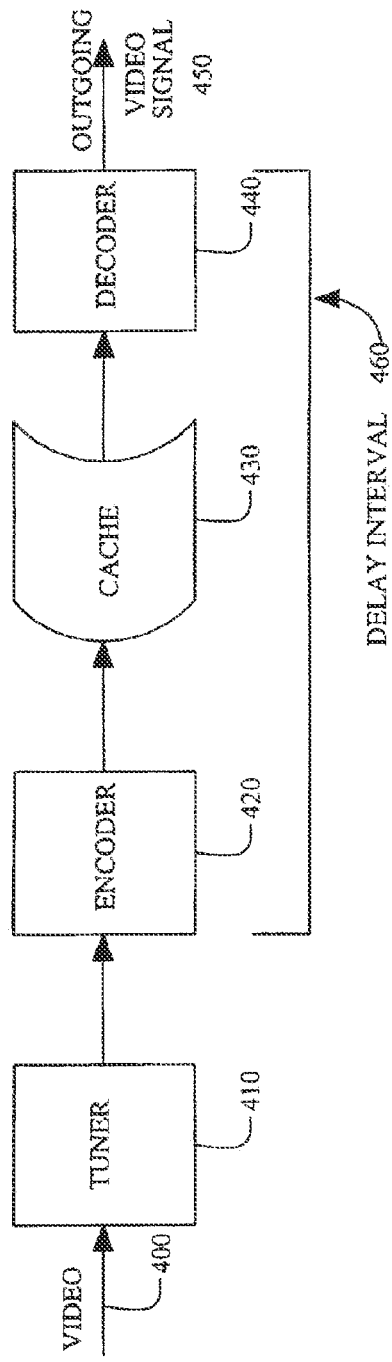
FIG. 4 is a diagram of a typical tuner arrangement for use with a live TV signal.
Figure 5:
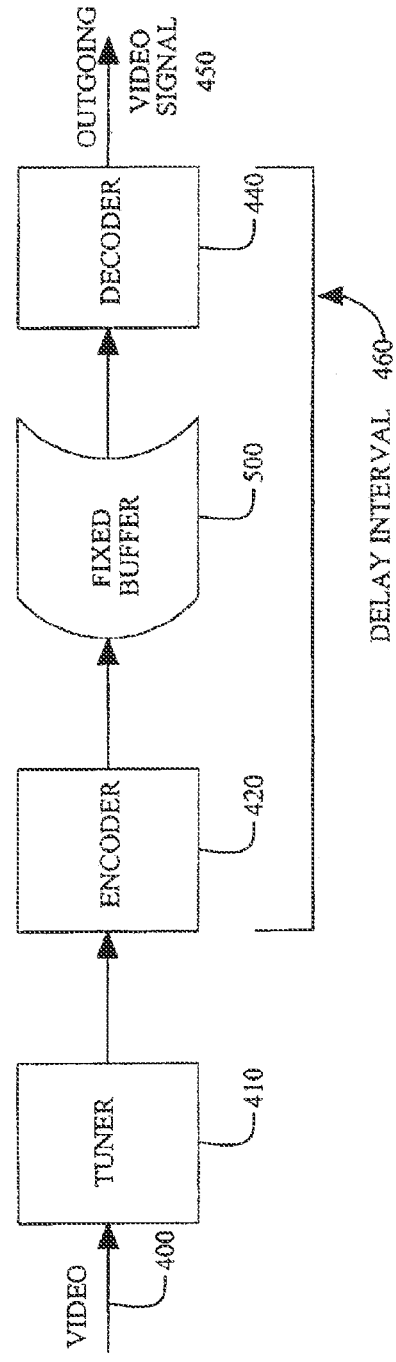
FIG. 5 is a diagram of a typical tuner arrangement for use when transferring a signal to a storage device.

Each decoder shown in FIG. 3 is associated with a tuner/encoder pair. For a live TV signal, FIG. 4 shows an example of a typical arrangement, where video signal 400 is transmitted to tuner 410 then to encoder 420 and to cache 430. After it leaves cache 430 it is decoded in block 440 and the outgoing video signal 450 is displayed on the television. It should be noted that a delay interval 460 of a given (x) number of seconds occurs between the time the signal reaches encoder 420 and is output by decoder 440. Therefore, a live TV signal is typically a signal that has been delayed by (x) seconds. If a user is watching a program and is currently transferring the program to a storage device as well, a cache, as shown in block 430 of FIG. 4 is not used. Instead, a fixed buffer 500, shown in FIG. 5 is used.

Figure 6:
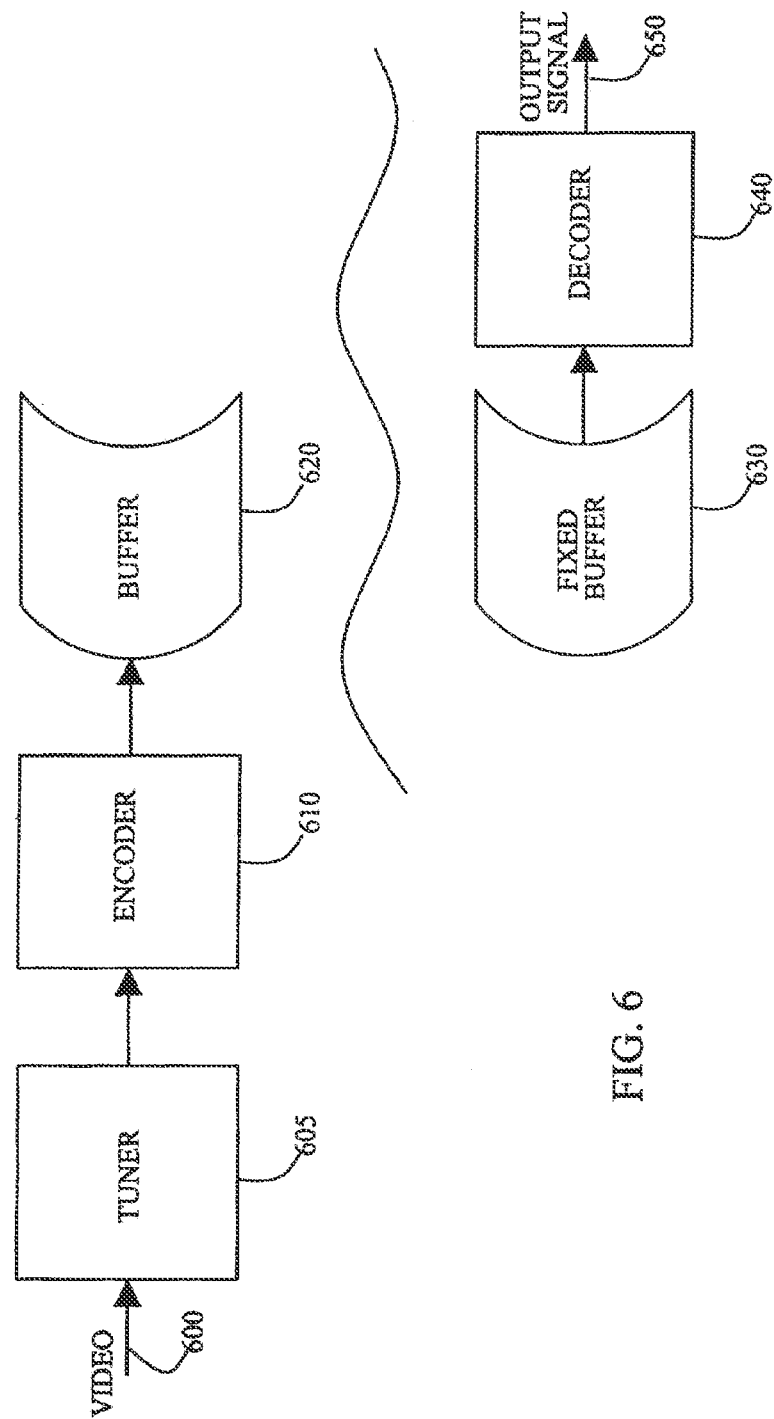
FIG. 6 shows an arrangement for when a user is watching a show that has already been transferred to a storage device.

If the user is watching a show that has already been transferred to the storage device, the decoder is decoupled from the encoder (i.e., it reads from a different cache than the encoder), which continues to encode and cache the live video signal. This embodiment is shown in FIG. 6, where video signal 600 is tuned at block 605 and encoded at block 610 and stored in buffer 620. Fixed buffer 630 is used to provide data to decoder 640, which provides the output signal 650.

Figure 7:
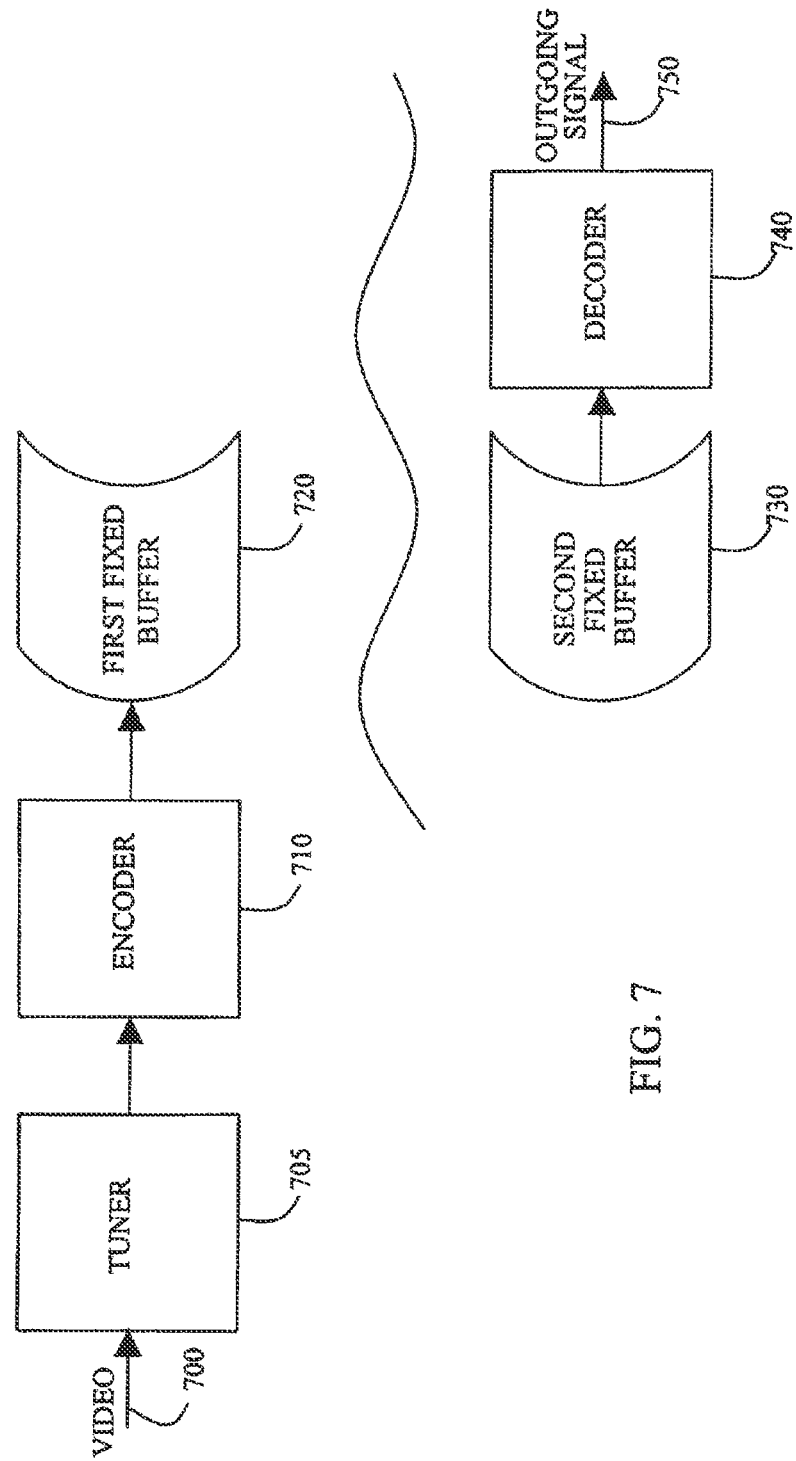
FIG. 7 shows an arrangement for when a user is watching a show on the storage device while another show is being transferred to the storage device.

Finally, if a user is watching a show that resides already on the storage device while another show is currently being transferred to the storage device, two different fixed buffers are implemented. This embodiment of the present invention is shown in FIG. 7. Video signal 700 is tuned at block 705 and encoded at block 710 and stored in a first fixed buffer 720. A second fixed buffer 730 is used to watch the previously saved show, by transmitting and decoding the data at block 740 and displaying the output video signal 750 on a television.

According to one embodiment of the present invention, the set-top box displays a graphical user interface (GUI), which gives the user the ability to watch and/or record timeslot based programming, to order on-demand programming, and to playback previously recorded shows that reside on a local or remote storage device (including a connected set-top box in another room of the user's house, for instance). The search engine is typically implemented as software resident on memory internal to the set-top box, such as a hard drive or Random Access Memory. But the search engine may also be implemented in part as firmware or hardware. The search engine code may also reside on a remote memory, either in another set-top box connected in a network, a shared hard drive, or as an Internet download.

In one embodiment, the search engine is integrated into three separate types of databases. The first type of database comprises data relating to timeslot based programming, the second type of database comprises data related to on-demand programming, the third type of database comprises data related to previously recorded shows that are available to the set-top box in use. Each type of database may be a single database or multiple databases of the same type. Moreover, if several separate databases of the same type are used, they may reside on a single storage location or they may be networked across multiple storage locations. For simplicity, each type of database is referred to as a "database", but it should be understood that, for instance, a timeslot based database includes typical timeslot based guide data, that is available to the user for free, and also timeslot based pay per view programming that incurs additional fees to the user which might reside in a different database physically.

Figure 8:
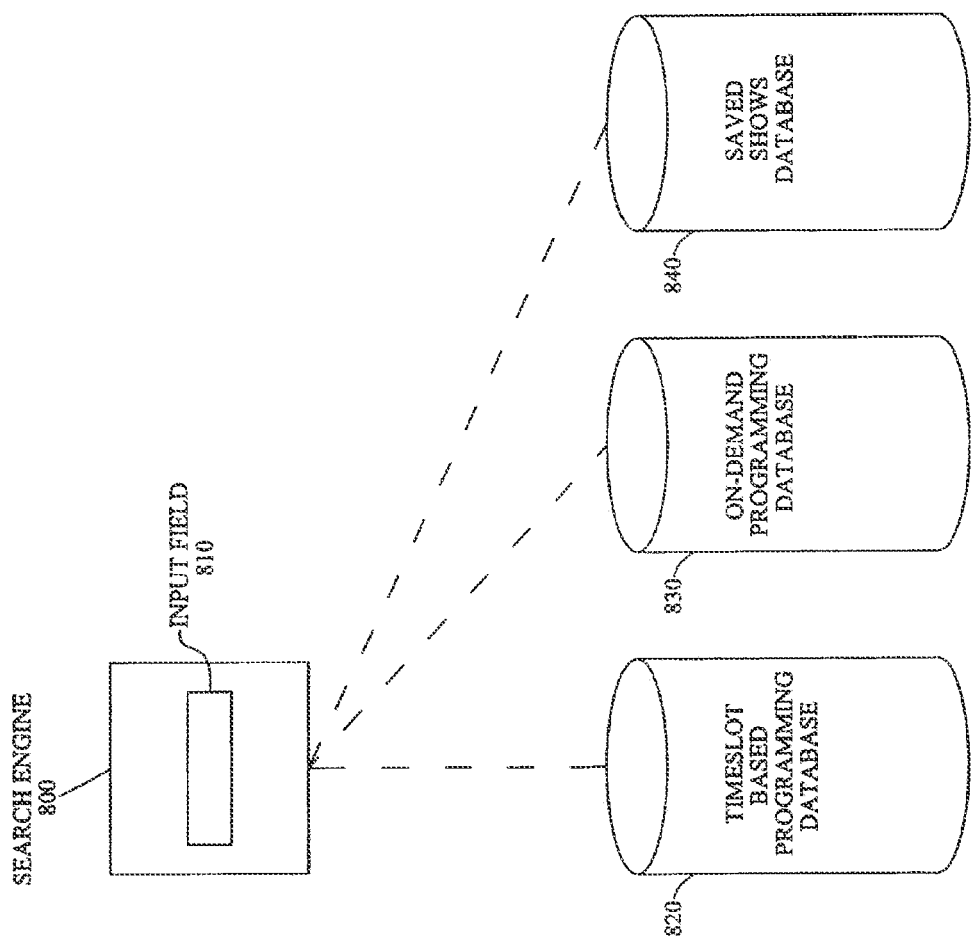
FIG. 8 shows the structure of a search engine that is used in one embodiment of the present invention.

FIG. 8 shows the structure of a search engine that is used in one embodiment of the present invention. Search engine 800 includes input field 810 where the user inputs a search. Input field 810 is configured to operate in conjunction with timeslot based programming database 820, on-demand programming database 830, and saved shows database 840.

Figure 9:
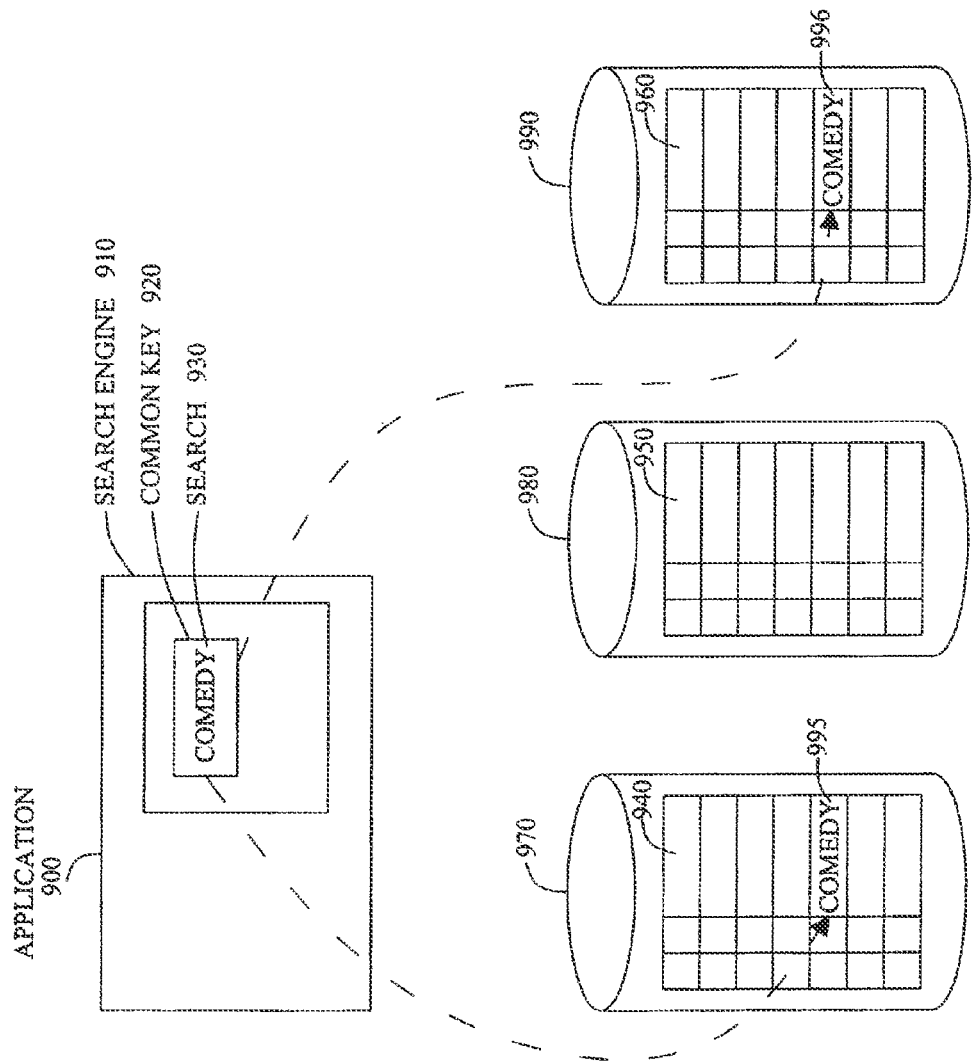
FIG. 9 shows the structure of a search engine that is used in one embodiment of the present invention.

In another embodiment, the search engine utilizes a common key that is used as the basis for a search of each of the thee separate databases. The common key is used to query each database to find database entries that match the key. Such keys are then used to output a list of results that match the search from all three databases. FIG. 9 shows the structure of a search engine for a video recorder that uses a common key.

Search engine 910 is a component of application 900 includes common key field 920 where a search 930 is entered. Search 930 is used as data to search for entries in an appropriate field 940, 950, and 960 in databases 970, 980, and 990 that match common key field 920. Once the appropriate fields 940-960 are located in the databases, each row in the column relating to the appropriate fields 940-960 is searched to match an entry 995 and 996, for instance, with search 930. The search of FIG. 9 is achieved by any available programming language, for instance query based languages for databases.

Figure 10:
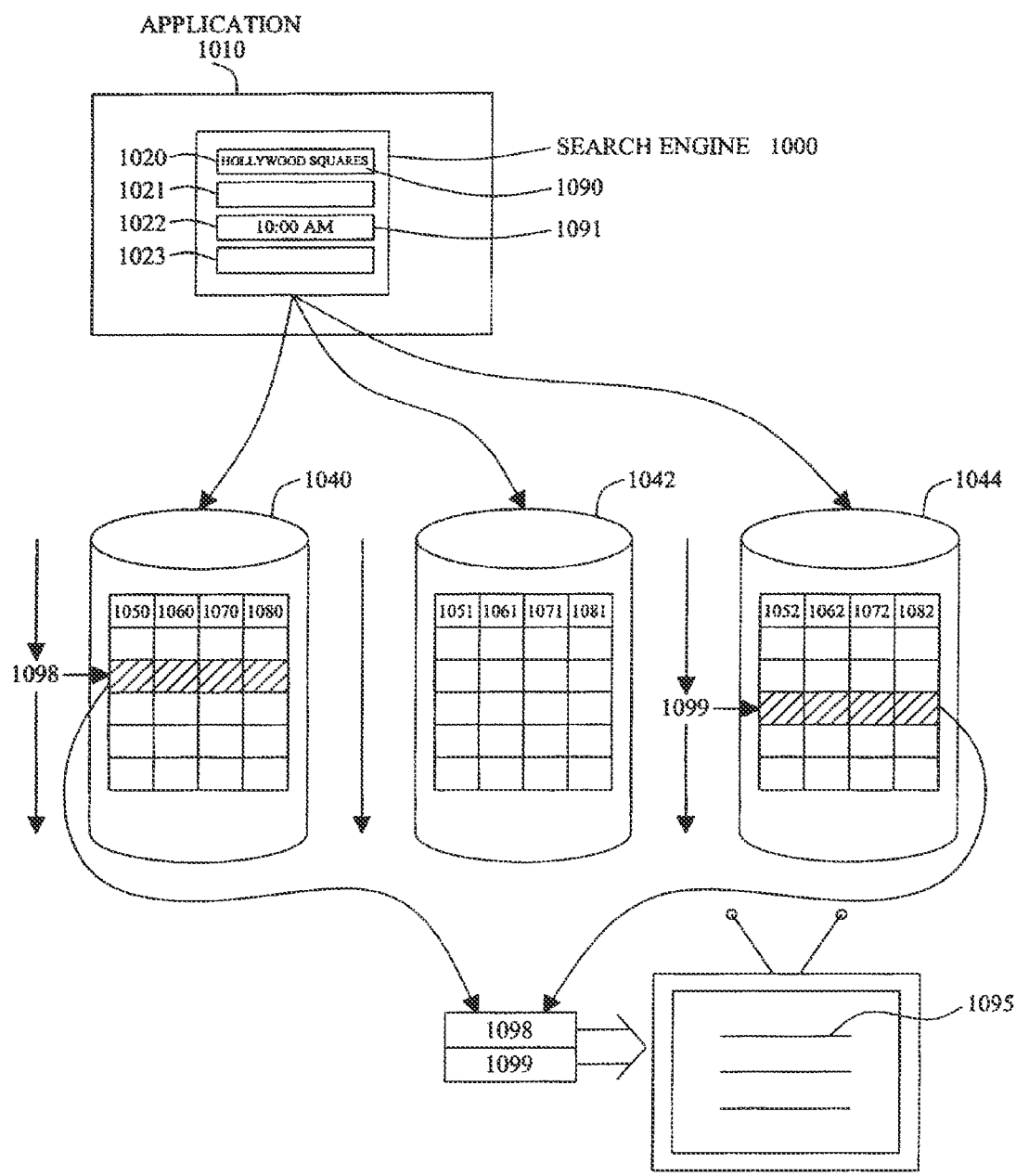
FIG. 10 shows the structure of a search engine that is used in one embodiment of the present invention.

In one embodiment, the search engine utilizes such factors, for instance, as title, category (e.g., horror), time, actors, etc. In this embodiment, shown in FIG. 10, search engine 1000 is a component of application 1010 includes fields, such as title 1020, category 1021, time 1022, and actor or actress 1023 where a search is entered. Fields 1020-1023 are shown by purpose of example only, other fields are possible as well. The search is used as data to search for entries in appropriate fields in timeslot based database 1040, on-demand based database 1042, and saved shows database 1044.

Each database includes, at least fields for title 1050-1052, category 1060-1062, time 1070-1072, and actor or actress 1080-1082. Each database 1040, 1042, and 1044 may have other fields as well, which are not shown for the purpose of simplicity. Entries 1090 and 1091 are used to query databases 1040, 1042, and 1044 in the appropriate database querying programming language. For instance, entries 1090 and 1091 might be "Hollywood Squares" and "10:00 AM". In such a case, entries 1090 and 1091 are compared to the entries in each row of databases 1040, 1042, and 1044 along columns 1060-1062 and 1070-1072. Once entries matching the query in both rows 1098 and 1099 are obtained, the results 1095 can be output to the user for further selection.

Figure 11:
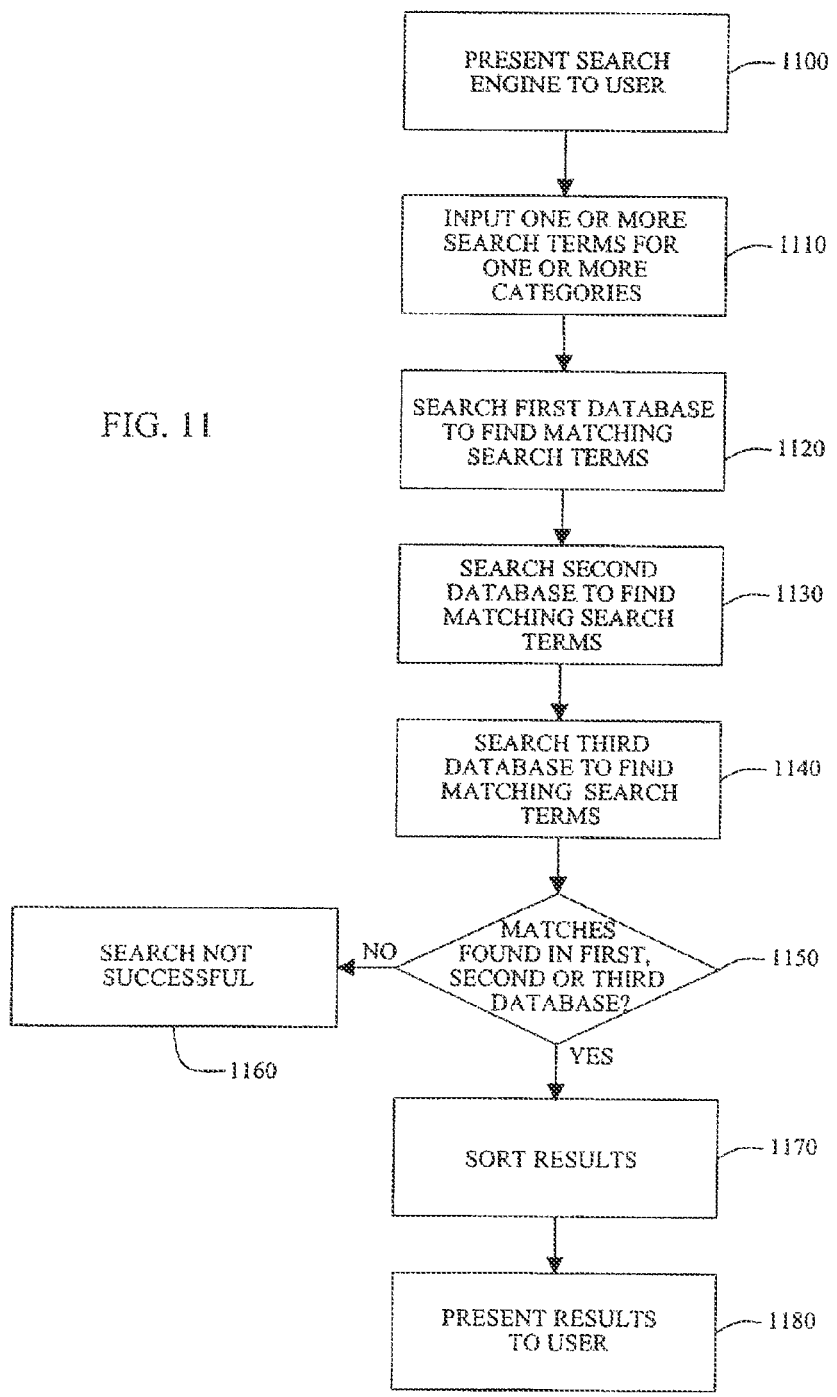
FIG. 11 is a flowchart showing the operation of a search engine that is used in one embodiment of the present invention.

FIG. 11 is a flowchart showing the operation of a search engine according to an embodiment of the present invention. At block 1100, a search engine is presented to the user. At block 1110, the user inputs one or more search terms for one or more categories. At block 1120, the search term for each category is used to find a matching entry in a first database. At block 1130, the search term for each category is used to find a matching entry in a second database. At block 1140, the search term for each category is used to find a matching entry in a third database. At block 1150, it is determined if one or more matches were found in the first, second, or third databases. If not, the search was not successful and this is conveyed to the user at block 1160. Otherwise, the results are sorted at block 1170 and presented to the user at block 1180. The results can be presented to the user, for instance, buy providing a visual indication to the type of show found. On-demand programming may be indicated as such, while timeslot based and saved programming may receive different visual indicators.

Figure 12:
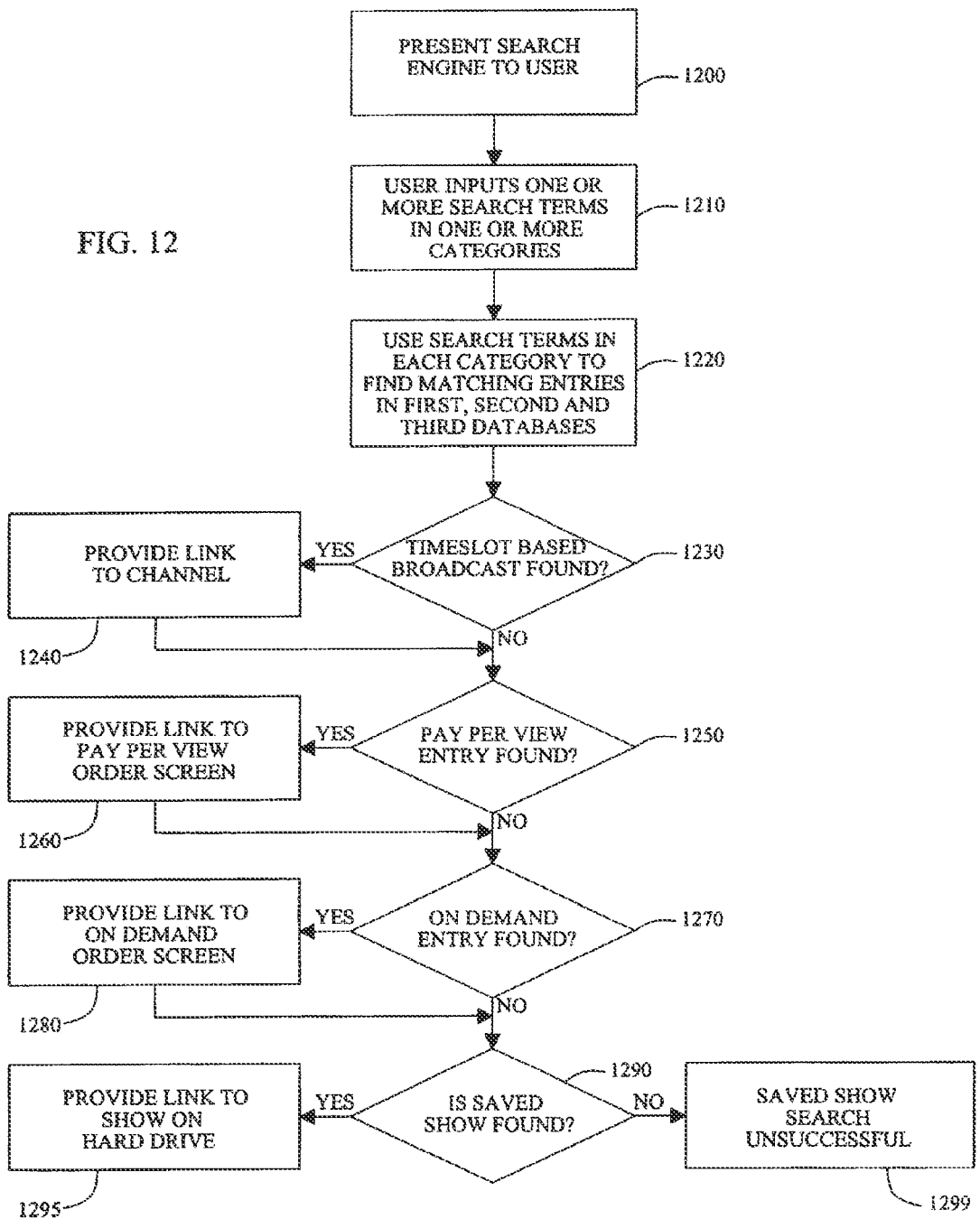
FIG. 12 is a flowchart showing the operation of a search engine in a linking model according to one embodiment of the present invention.

The present invention can be used in a "linking" model or an "acting on model. In the linking model, results that are chosen that are on demand" or "pay-per-view" (i.e., timeslot based) cause a link to be invoked that send the user to a separate application that allows the user to get more information and/or begin a process of ordering and paying for the show. FIG. 12 is a flowchart showing the steps involved in a search that uses the "linking" model. At block 1200 a search engine is presented to the user. At block 1210, the user inputs one or more search terms in one or more categories. At block 1220, the search term for each category is used to find a matching entry in a first, second and third database.

At block 1230, it is determined if a timeslot based broadcast is found. If so, a link is provided that allows the user to tune to that broadcast at block 1240. After block 1240 or if no a timeslot based broadcast is found, it is determined if a timeslot based pay-per-view entry was found at block 1250. If so, the user is provided with a link to a page where the user can order the pay-per view program at block 1260. After block 1260 or if no timeslot based pay-per-view entry was found, then at block 1270, it is determined if an on-demand entry was found. If so, then at block 1280, a link is provided to a page where the user can purchase the on-demand programming. After block 1280 or if no on-demand entry was found, then at block 1290, it is determined if a show that has been saved on the local set-top box's hard drive or a connected hard drive is found. If so, a link is provided at block 1295 that allows the user to retrieve the saved show from the appropriate storage device. Otherwise the search was unsuccessful for saved shows at block 1299.

Figure 13:
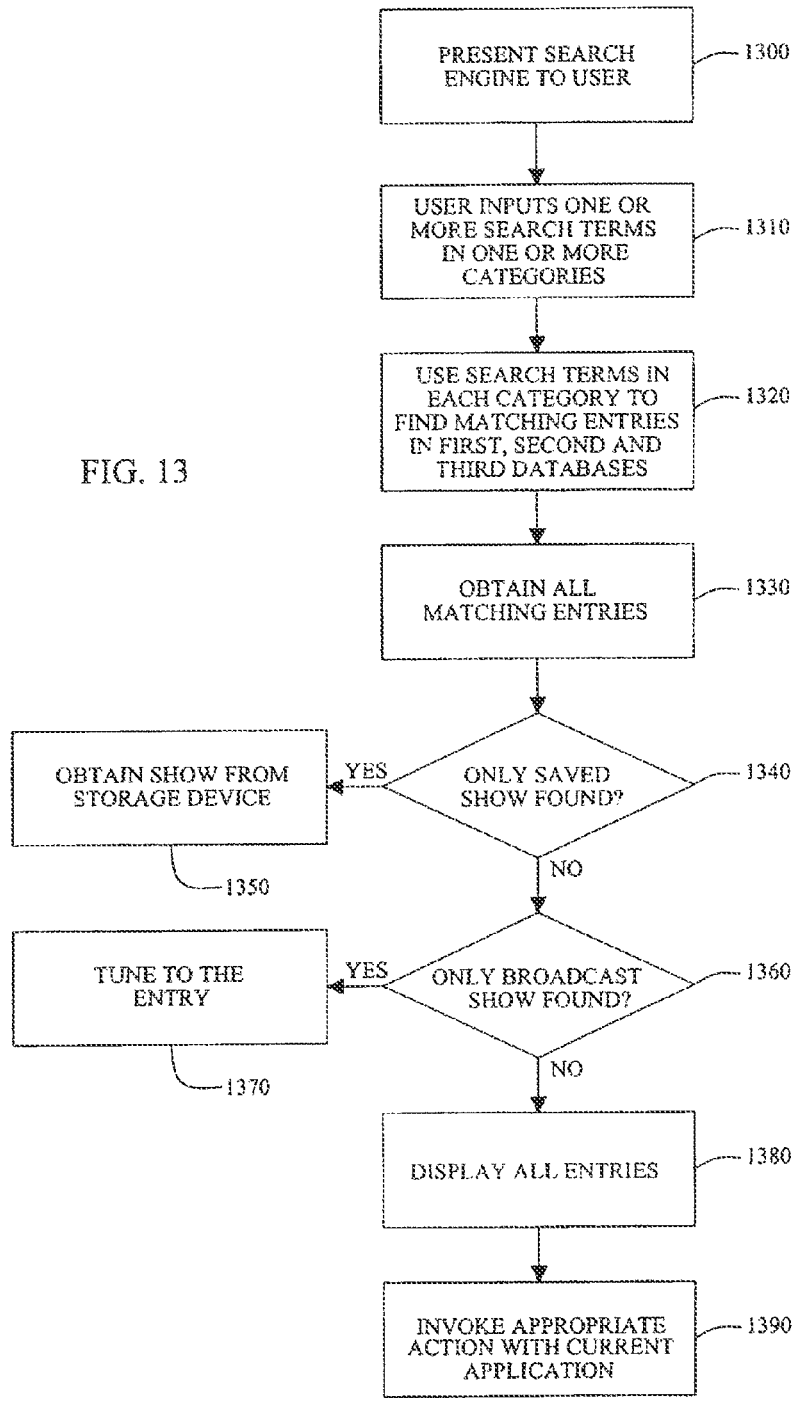
FIG. 13 is a flowchart shoeing the operation of a search engine in an acting on model according to one embodiment of the present invention.

In the "acting on" model a single application controls the entire process of searching, purchasing, and watching, without linking to a separate application. The "acting on" model is illustrated in FIG. 13. At block 1300 a search engine is presented to the user. At block 1310, the user inputs one or more search terms in one or more categories. At block 1320, the search term for each category is used to find a matching entry in a first, second and third database. At block 1330, all of the matching entries are obtained. At block 1340, it is determined if only a saved show was found. If so, the saved show is obtained from a storage device at block 1350. Otherwise, at block 1360, it is determined, if only a broadcast entry was found. If so, the system tunes to that entry at block 1370. Otherwise all entries are displayed at block 1380 and the user chooses the appropriate action that is invoked by the current application at block 1390.

Figure 14:
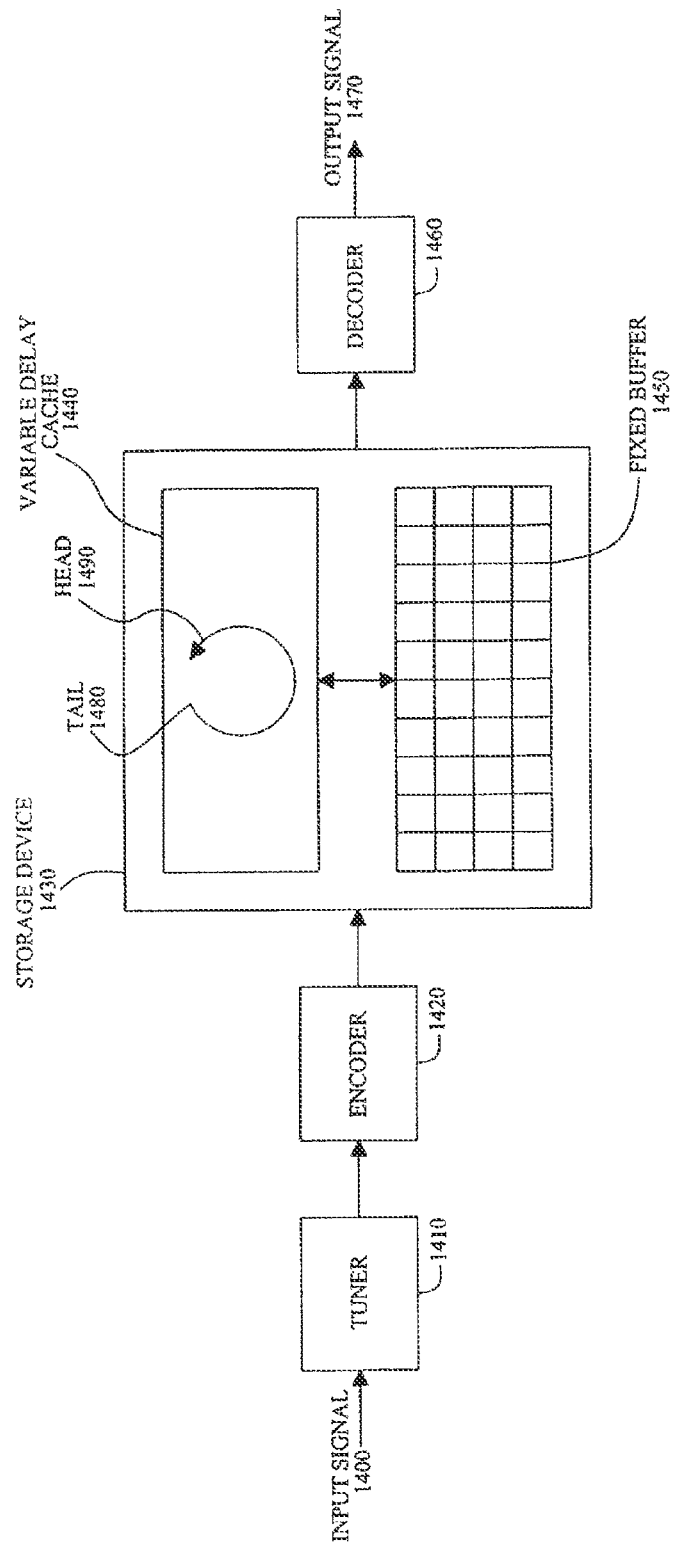
FIG. 14 is a functional block diagram of some of the components of one embodiment of the present invention.

The operation of one embodiment of a set-top box is shown in FIG. 14. An input signal 1400 arrives at tuner 1410 and is encoded at block 1420. A storage device 1430 comprises a variable delay cache 1440 and a fixed buffer 1450. If the user is watching live television, the input signal 1400 is typically handled first in variable delay cache 1440. In this example, variable delay cache has a structure that is logically circular. The size of the cache controls the amount of delay. As signals are received in the cache 1440 they are added to the tail 1480 of the cache 1440.

As new signals are received, they eventually move to the head 1490 of the cache 1440. At that time, they are decoded at block 1460 and transferred as an output signal 1470 to an output device such as a television, for instance. The delay between the head 1490 and the tail 1480 is adjustable or can be completely eliminated to have a true "live television" experience. Variable delay cache 1440 is shown being a circular buffer, however, the actual locations in the storage device 1430 need not be contiguous or even reside on the same storage device. Instead, they can be in disparate locations on storage device 1430 and connected, for instance using pointers or other memory reference techniques, so that there is an ability to produce the data in a logical manner, but an actual contiguous space in storage device 1430 need not be reserved for the variable delay cache 1440. Moreover storage device 1430 can be used to represent the storage devices of multiple video recorder connected in a computer network arrangement.

Figure 15:
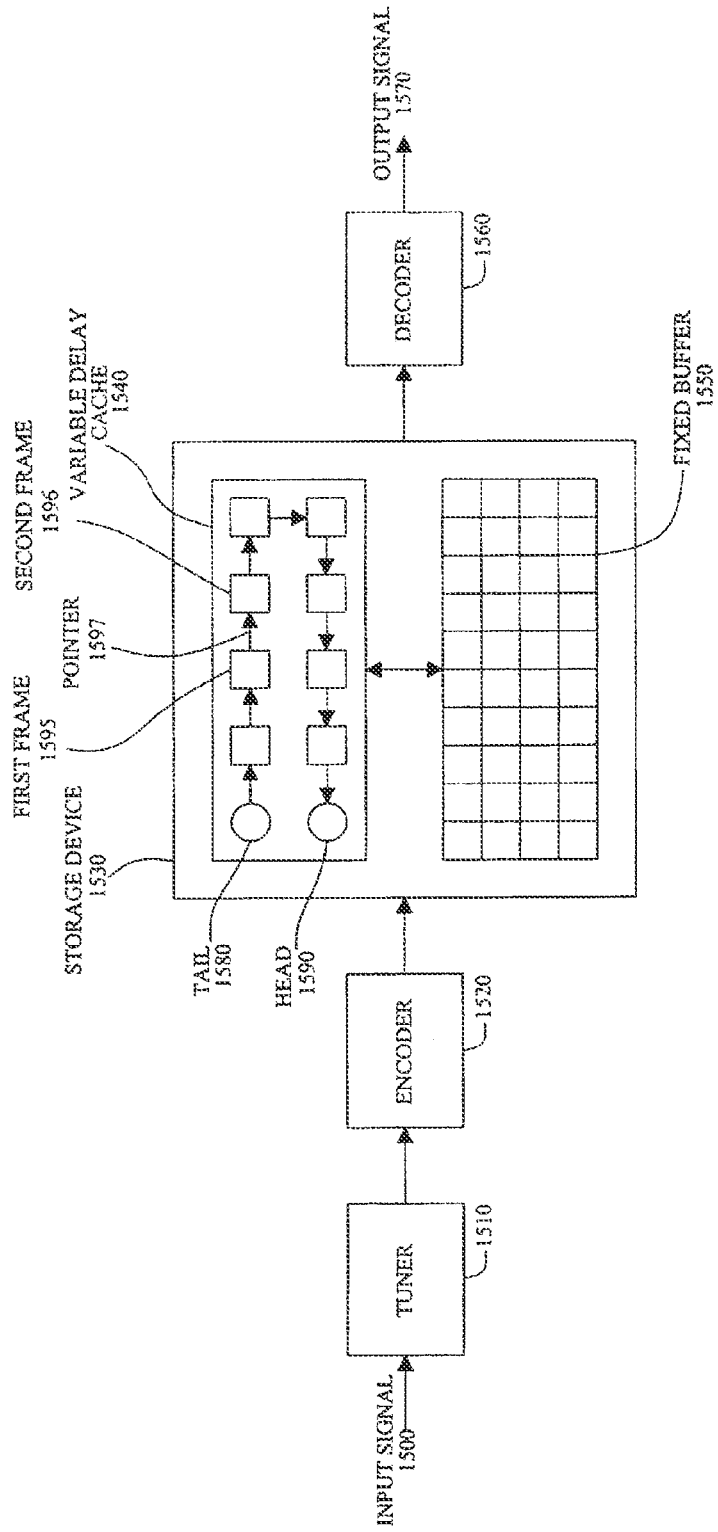
FIG. 15 is a functional block diagram of some of the components of one embodiment of the present invention.

FIG. 15 shows the operation of a set-top according to another embodiment of the present invention. An input signal 1500 arrives at tuner 1510 and is encoded at block 1520. A storage device 1530 comprises a variable delay cache 1540 and a fixed buffer 1550. If the user is watching live television, the input signal 1500 is handled first in variable delay cache 1540. In this example, variable delay cache has a structure that is a linked list of files wherein each file represents one or more frames of the video that arrives along input signal 1500. The size of the linked list controls the amount of delay. As signals are received in the cache 1540 they are added to the tail 1580 of the cache 1540.

As new signals are received, they eventually move to the head 1590 of the cache 1540. At that time, they are decoded at block 1560 and transferred as an output signal 1570 to an output device such as a television, for instance. The delay between the head 1590 and the tail 1580 is adjustable or can be completely eliminated to have a true "live television" experience. Variable delay cache 1540 in linked list form connects each frame by a pointer structure, wherein a first frame 1595 and a second frame 1596 in storage device 1530 appear to be logically located near each other, or contiguous in storage device 1530, but actually first frame 1595 and second frame 1596 may be located far apart on storage device 1530 and are logically linked by pointer reference 1597.

It should be noted that the search engine of the present invention can be configured to be utilized with any one or all three of the above database types. The search engine may be of multiple types according to the present invention. One type comprises a keyword type search, which has been used by way of example in FIGS. 8-15. In another embodiment, the search engine comprises an on-screen, alpha-numeric interface area that lets the user select letters or numbers using an input device such as a remote control. As the user selects letters or numbers, the system interfaces with one or more databases to locate entries that have a possibility of being matches with the user's initial selection from the alpha-numeric interface area. As the user proceeds to select more letters or numbers, the system continues using the database to narrow the potential results to output to the screen.

Figure 16:
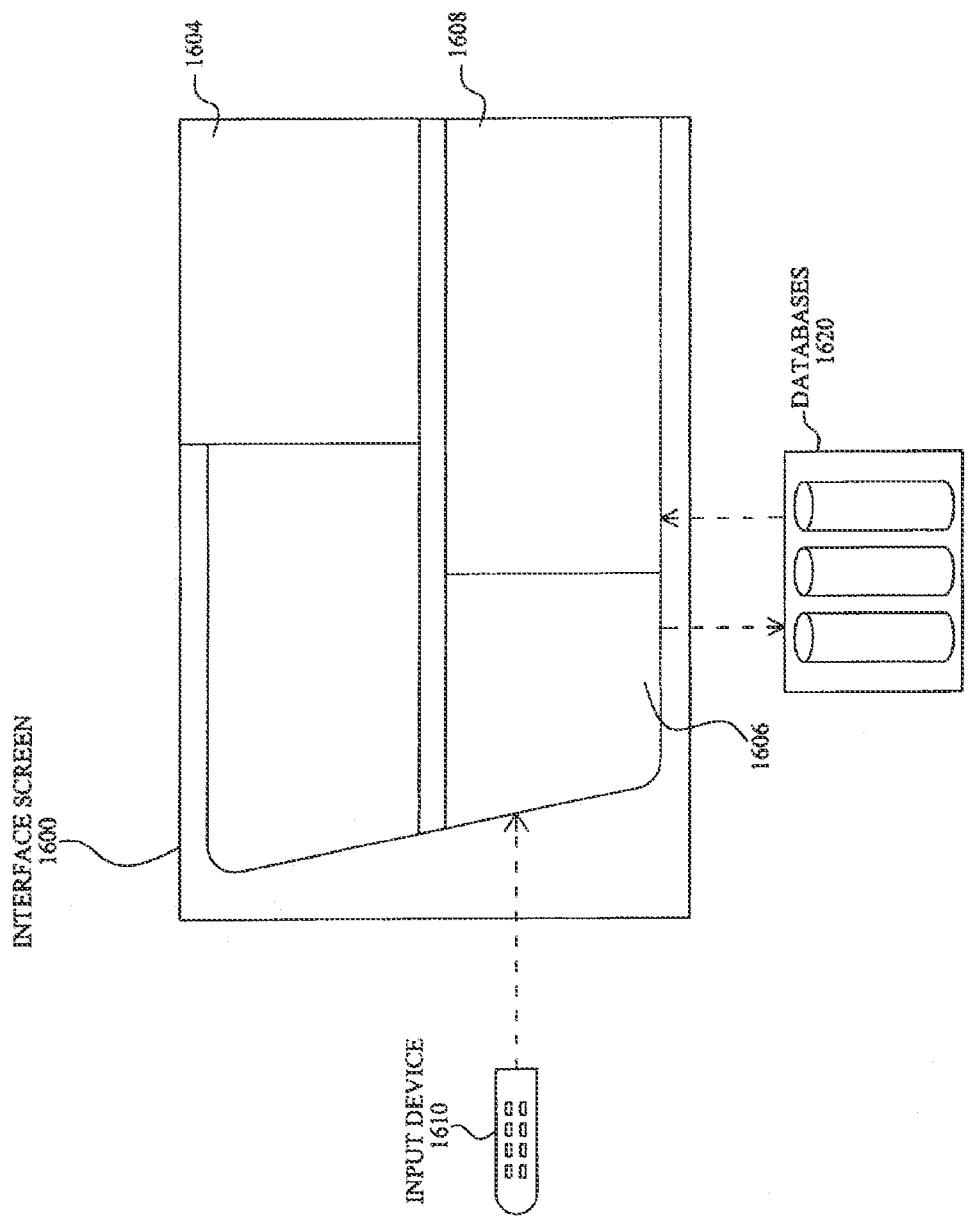
FIG. 16 is a diagram showing one example of a search engine according to an embodiment of the present invention.

In one embodiment, the alpha-numeric interface area is modified after each selection by making invalid letters and numbers inaccessible to the user, for instance by making it appear opaque and un-selectable. This embodiment is shown in FIG. 16. Interface screen 1600 includes an optional video or additional information area 1604, an alpha-numeric input area 1606, and a search results area 1608. Alpha-numeric input area 1606 includes a plurality of letters and numbers more or less reproducing on a screen the options that are available to a user of a keyboard. By use of an input device

1610, such as a remote control, the user can navigate alpha-numeric input area 1606 and select letters and/or numbers in an iterative process.

When the user selects a letter or number, the system uses that letter or number to search one or more databases 1620. The one or more databases 1620 may be accessed, for instance, in the manner shown with respect to FIGS. 8-15 or in any other manner known to those skilled in the art. The single letter or number search typically will elicit many results which are displayed in search results area 1608, however, it will also nullify many possible selections in alpha-numeric input area 1606. For instance, an initial selection of the letter "Z" might produce hundreds of results, yet none of them contain the combination of "ZQ". Thus the system will modify alpha-numeric input area 1606 to make the letter "Q" opaque or otherwise inactive. Thus as the user continues to select letters or numbers, the possible results continue to narrow and the possible valid entries in alpha-numeric input area 1606 continue to be reduced. The same iterative process may be implemented using a keyword search, rather than an alpha-numeric input area. In such a case, the iterative process may be repeated, as each subsequent letter is typed in by the user into a search engine keyword search field.

Figure 17:
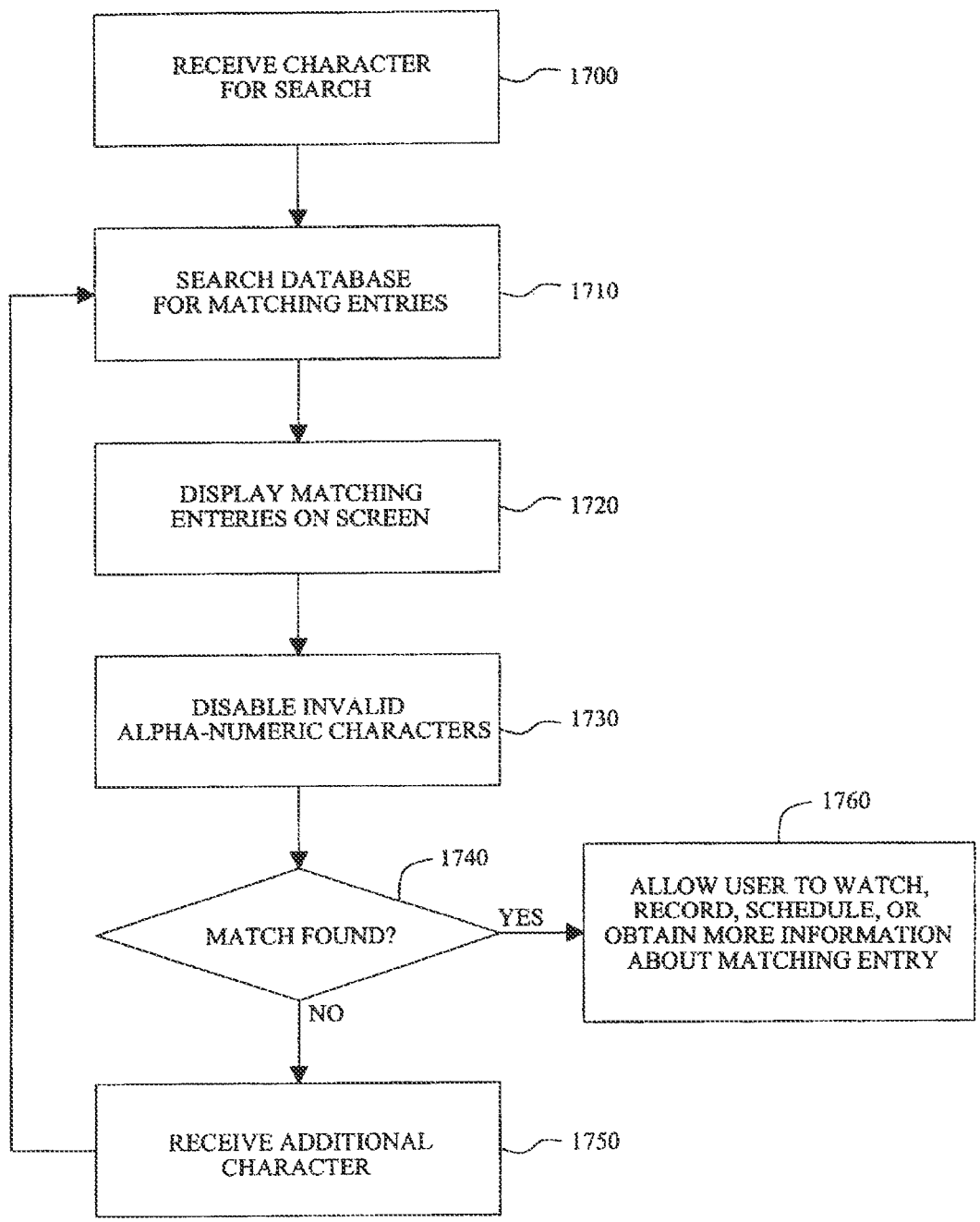
FIG. 17 is a flowchart showing the operation of a search engine that is used in one embodiment of the present invention.

The steps taken by a search engine according to an embodiment of the present invention are shown in FIG. 17. At block 1700 a character is received for searching. At block 1710 the database is searched for matching entries. At block 1720 the matching entries are displayed on the screen. At block 1730 the alpha-numeric characters that are no longer valid are disabled, for instance by making those characters inaccessible on the screen. At block 1740, it is determined if the user has selected one of the results that are output to the screen using their input device. If so, a match is found and a further action is performed by the user with respect to the show at block 1760. Such a further action includes, for instance, recording the show, scheduling the show to be recorded in the future, watching the show, or receiving additional information about the show. Otherwise, no match has been found yet, so at block 1750 the system waits for the user to input an additional character and the process repeats at block 1710.

In one embodiment, the results of a successful search query are organized using categories. For instance, results may be obtained by creating folders of all shows where a certain actor or actress appears, where their name matches the selections by the user. Alternatively, matching shows may be listed by show title, show type, or other appropriate category. Identical instances of the same show that are aired at different times or on different channels may be displayed as a single folder on-screen which allows the user to open the folder to find the instance of the show most appropriate to them. Once a result is found by the user, they may view the show, find out more information about the show, record the show, or schedule the show to be recorded later.

Figure 18:
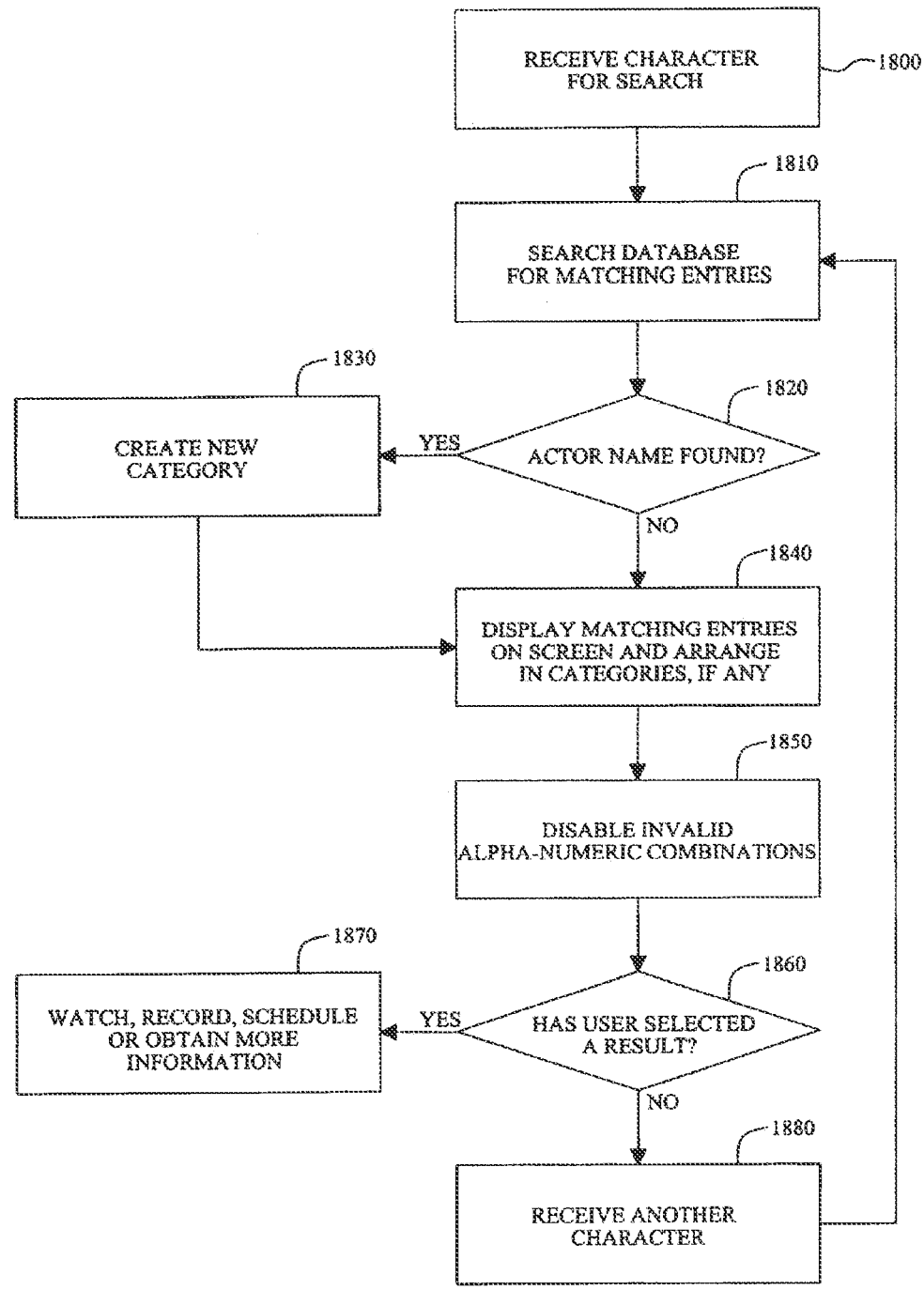
FIG. 18 is a flowchart showing the operation of a search engine that is used in one embodiment of the present invention.

The steps taken by a search engine according to one embodiment of the present invention is shown in FIG. 18. In this embodiment, the name of an actor or actress is promoted to a category if a match occurs in the database and all instances of shows where the actor or actress appears are organized within the new category. At block 1800 a character is received for searching. At block 1810 the database is searched for matching entries. At block 1820 it is determined if an actor or actress with a name matching the search entry is found. If so, a new category is created under the actor's name at block 1830 and any subsequent shows to be output by the search engine are organized in the new category. After the category is created, or if no actor name is found, the matching entries are displayed on the screen at block 1840. At block 1850 the alpha-numeric characters that are no longer valid are disabled, for instance by making those characters inaccessible on the screen.

At block 1860, it is determined if the user has selected one of the results that are output to the screen using their input device. If so, a match is found, and a further action is performed by the user with respect to the show at block 1870. Such a further action includes, for instance, recording the show, scheduling the show to be recorded in the future, watching the show, or receiving additional information about the show. Otherwise, no match has been found yet, so at block 1880 the system waits for the user to input an additional character and the process repeats at block 1810.

Figure 19:
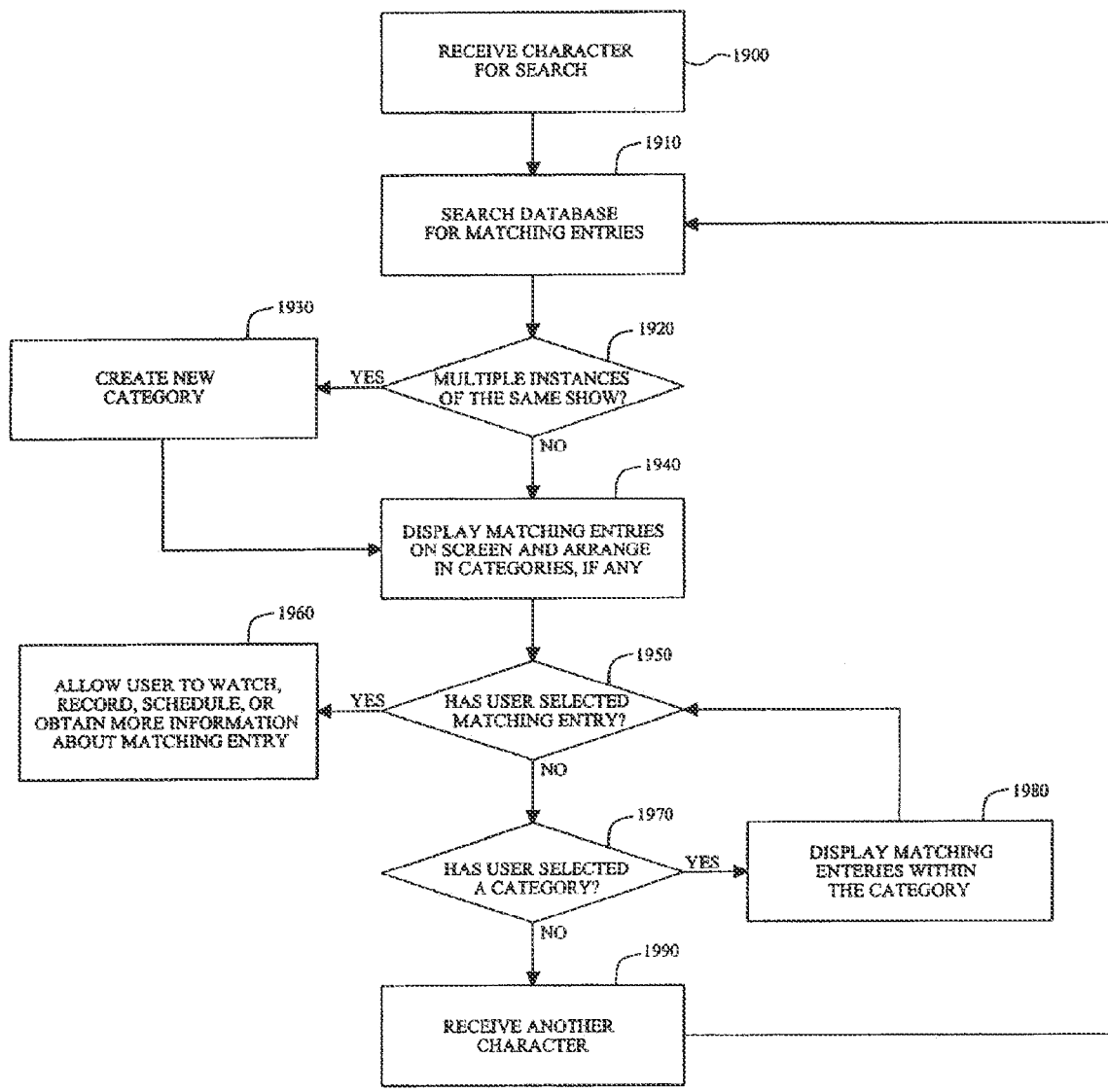
FIG. 19 is a flowchart showing the operation of a search engine that is used in one embodiment of the present invention.

The steps taken by a search engine according to another embodiment of the present invention are shown in FIG. 19. In this embodiment, shows that match the user's search query are organized in such a manner that the same instances of matched shows that are repeated at different times, or on different days, or on different channels, are all organized into a single folder when the results are output to the screen.

At block 1900 a character is received for searching. At block 1910 the database is searched for matching entries. At block 1920 it is determined if multiple instances of the same show are found. If so, a new category is created under the name of the show that has multiple instances at block 1930 and any subsequent shows to be output by the search engine are organized in the new category. After the category is created, or if no shows having multiple instances are found, the matching entries are displayed on the screen at block 1940.

At block 1950, it is determined if the user has selected one of the results that are output to the screen using their input device. If so, a match is found, and a further action is performed by the user with respect to the show at block 1960. Such a further action includes, for instance, recording the show, scheduling the show to be recorded in the future, watching the show, or receiving additional information about the show. Otherwise, no match has been found yet, so at block 1970 it is determined if the user selected one of the categories, if any, that are displayed on the screen. If so, the matching entries within the category are displayed at block 1980 and block 1950 repeats. Otherwise, no match has been found yet, so the system waits for the user to input an additional character at block 1990 and the process repeats at block 1910.

Figure 20:
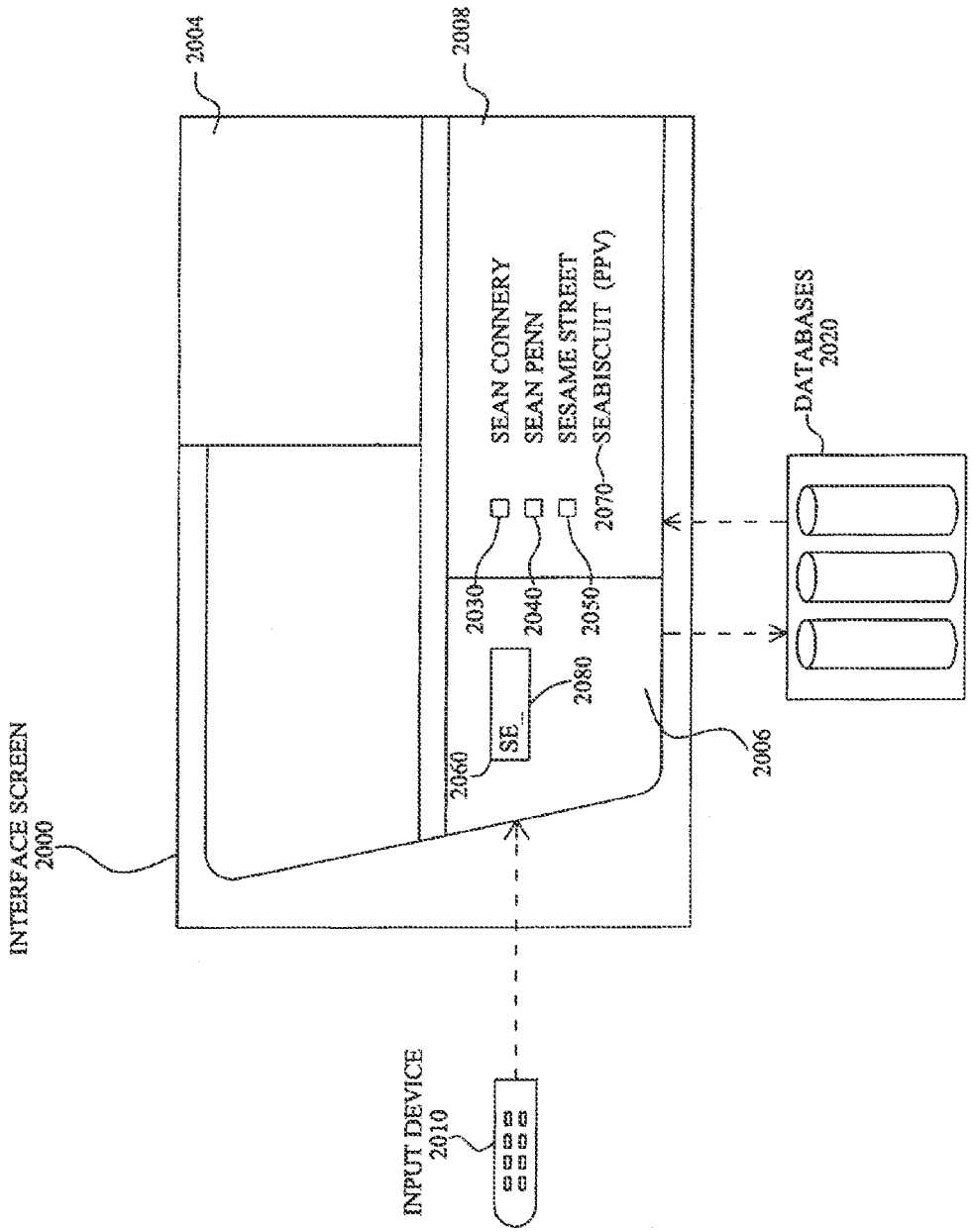
FIG. 20 is a diagram showing one example of a search engine according to an embodiment of the present invention.

FIG. 20 shows an embodiment of the present invention that organizes search results on the screen in an enhanced manner, for instance by using one or more of the processes described with respect to FIGS. 17-19. Interface screen 2000 includes an optional video or additional information area 2004, an input area 2006, and a search results area 2008. Input area 2006 in this embodiment uses a keyword search engine, although it might also use interchangeably an alpha-numeric input area. By use of an input device 2010, such as a remote control, the user can utilize input area 2006 and input letters and/or numbers in an iterative process.

When the user selects a letter or number, the system uses that letter or number to search one or more databases 2020. The single letter or number search typically will elicit many results which are displayed in search results area 2008, if the number of results are below a certain threshold. For instance, results exceeding 100 might not be displayed and the system might wait until it has received a narrow enough search to display less than 100 results on the screen. In this example the character "S" was first input into keyword search field 2060. "S" retrieved too many results and nothing was displayed until the user input a second character "E" into field 2060, so that cursor 2080 was waiting for a third character to be input.

The search of databases 2020 with the character string "SE" brought up several different types of results. First, Categories 2030 and 2040 were created after matching the actor's name field in database 2020 to the "SE" character string representing Sean Connery and Sean Penn. Within categories 2030 and 2040 would be individual instances of movies where these actors appeared. Secondly, A category 2050 was created to hold several instances of the same show called "Sesame Street". Within category 2050 would be a plurality of either times, days, or channels where the same show having the title "Sesame Street" occurs. Third, an entry 2070 was created for the pay-per-view movie "Seabiscuit", which was obtained by searching a separate or integrated database shown as databases 2020. Output area 2008 could also include media-on-demand matches and matches to shows that are already saved in a storage medium, such as a hard disk of the current or an attached set-top box.

Figure 21:
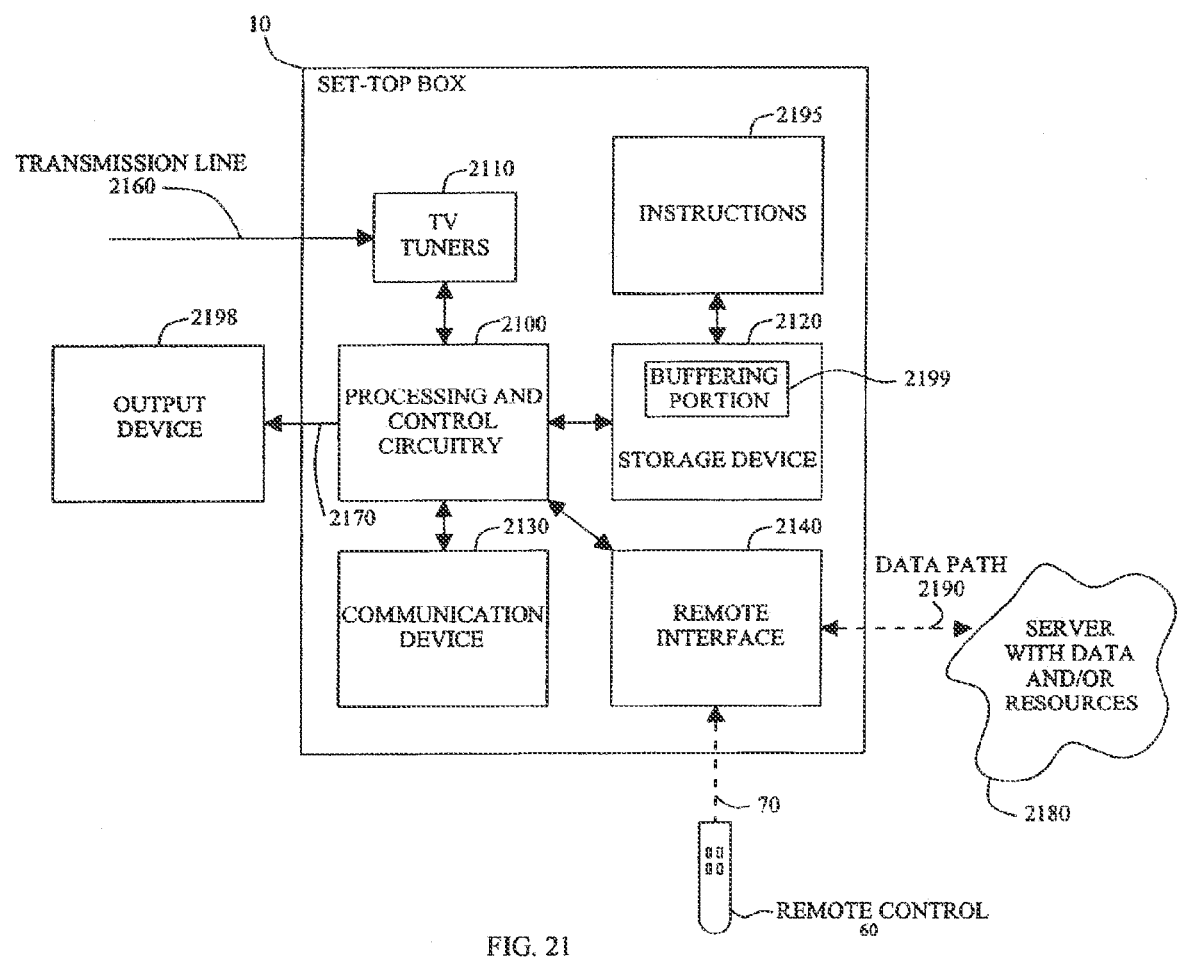
FIG. 21 is a functional block diagram of some of the components of one embodiment of the present invention.

FIG. 21 is a functional block diagram that illustrates the components of an embodiment of the present invention. Note that FIG. 21 is intended to be a conceptual diagram and does not necessarily reflect the exact physical construction and interconnections of these components. Set-top box 10 includes processing and control circuitry 2100, which controls the overall operation of the system, the processing and control circuitry includes such components as processors, registers, buses, and other circuitry needed to operate a computing device. Coupled to the processing and control circuitry 2100 are one or more TV tuners 2110, a storage device 2120, a communication device 2130, and a remote interface 2140.

Tuners 2110 receive broadcast signals on transmission line 2160, which may originate from an antenna, a cable television outlet, a satellite connection, or another suitable broadcast input source. Processing and control circuitry 2100 provides audio and video output to device 2198 via a line 2170. Remote interface 2140 receives signals from remote control 60 via wireless connection 70. Communication device 2130 is used to transfer data between set-top box 10 and one or more remote processing systems, such as a server 2180, via a data path 2190. Server 2180 includes, for instance, a web server, or other set-top boxes connected in a network arrangement, where data from the web or resources from connected set-top boxes are available via data path 2190.

Processing and control circuitry 2100 may include one or more of devices such as general-purpose microprocessors, digital signal processors, application specific integrated circuits, various types of signal conditioning circuitry, including analog-to-digital converters, digital-to-analog converters, input/output buffers, etc. Storage device 2120 may include one or more physical memory devices, which may include volatile storage devices, non-volatile storage devices, or both. For example, storage device 2120 may include both random access memory (RAM), read-only memory (ROM), hard disk drives, various forms of programmable and/or erasable ROM, flash memory, or any combination of these devices.

Communication device 2130 may be a conventional telephone modem, an Integrated Services Digital Network adapter, a Digital Subscriber Line adapter, a cable television modem, or any other suitable data communication device. Instructions 2195 typically are resident in storage device 2120. Instructions 2195 control the overall functionality of the system, including the GUI, IPG, and the presentation of search engines. For instance, a search engine may be presented to a user and based on the search, instructions 2195 might tell set-top box 10 to use processing and control circuitry to search one or more databases in both storage device 2120 and along data path 2190. The results might, for instance, per instructions 2195, be retrieved, sorted, and presented to the user on output device 2198 as links, or they could be invoked directly, for instance, to cause output device 2198 to use tuners 2110 to tune to a specific channel.

It should be noted that for simplicity of use, the search engine of the present invention need not be presented to the user on an output device, Instead, the search engine may be in the background, and hence invisible to the user, yet still used to access results that the user selects. In this embodiment, a "theme view" is used to guide the background search engine in its task of obtaining results. The theme view presents a series of lists to the user that allows the user to narrow down the potential set of results, without inputting characters into a search engine prompt.

The theme view operates, for instance, by presenting a first broad list of themes (i.e., family, news, and sports). By selecting one of the choices, a sub-category list is presented (i.e., family→cartoons, sports→football, sports, →basketball). By narrowing down the potential results in this manner, the user avoids typing in keywords and narrows the pool of potential results for the search engine. Once the pre-defined lists have become as narrow as possible, the search engine still searches as shown in accordance with one or more embodiments of the invention and presents the results. This step of searching, however, is transparent to the user and occurs in the background instead of as a result of an affirmative action by the user.

Figure 22:
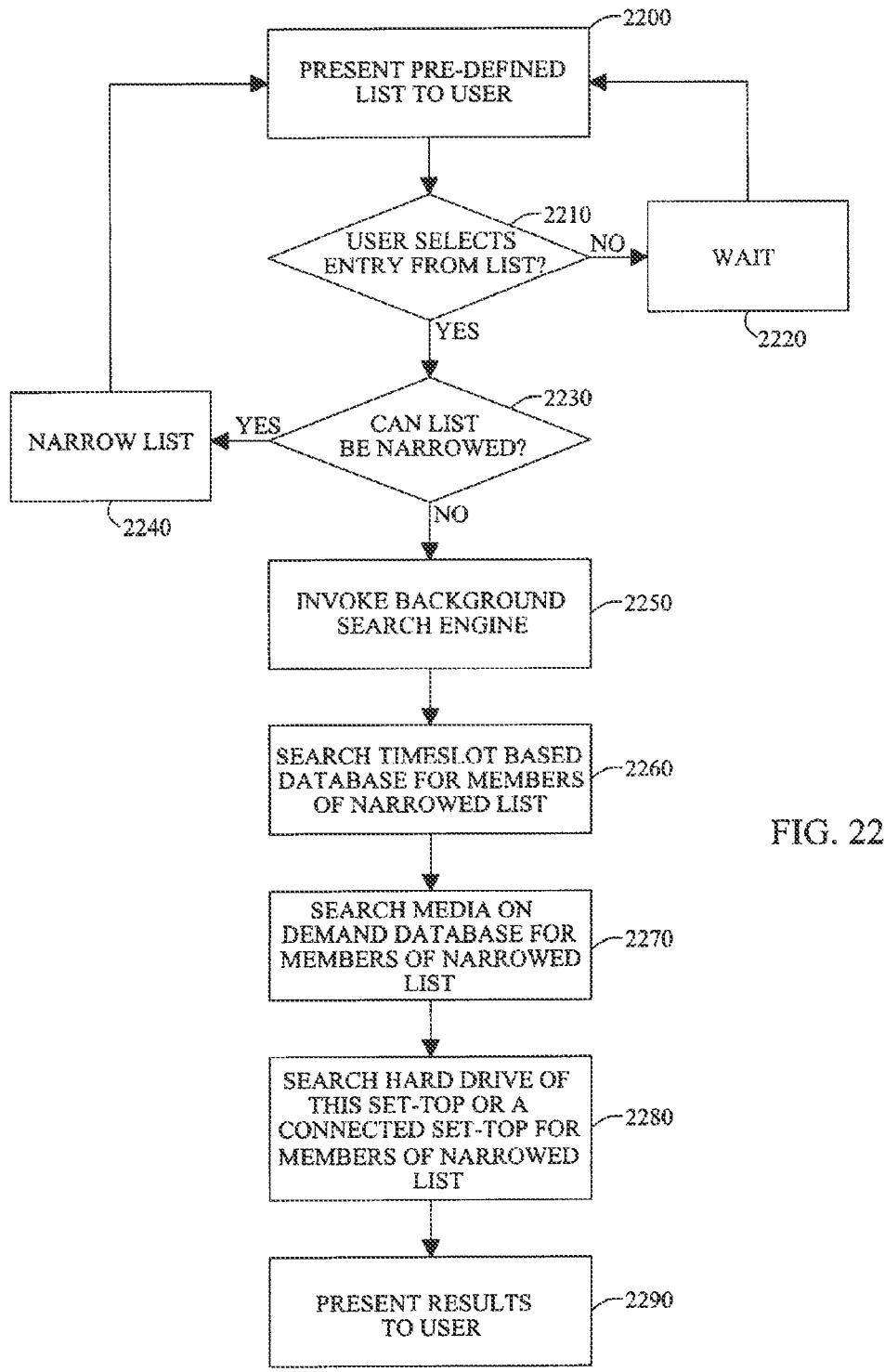
FIG. 22 is a flowchart showing an example of a theme view according to an embodiment of the present invention.

FIG. 22 is a flowchart showing an example of a theme view according to an embodiment of the present invention. At step 2200 a pre-defined list is presented to a user. The pre-defined list can be created from any of a number of locations, but is typically provided by the set-top box provider. The pre-defined list has an entry that the user selects at block 2210. The system waits at block 2220 until the selection is made. When the user makes the selection, the system determines if it can narrow the list further at block 2230. If so, the list is narrowed at block 2240 and the process repeats at block 220 using the narrowed, pre-defined list.

Once the narrowest list is found, a background search engine is invoked at block 2250. At block 2260, the search engine searches a database of timeslot based programming for members of the narrowed list. At block 2270, the search engine searches a database of non-timeslot based programming for members of the narrowed list. At block 2280, the search engine searches a database relating to shows saved in the storage device (hard drive) of the current and any connected set-top boxes for members of the narrowed list. At block 2290, the user is presented with the results.

As discussed with other embodiments of the present invention, members of each list are determined by keywords that are stored in the databases associated with each entry that the user can search for. Hence, if the user had narrowed the list down to sports, football and this is the narrowest invocation of the list, then keywords of sports and football, which are potentially associated with each entry in all of the databases are searched for. When a show in any of the databases is found that has these associated characteristics, it becomes a member of the narrowed list and it is added to the list of results that the search engine will output to the user.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method of searching for media comprising:
receiving, from an input device, a search entry comprising one or more characters, wherein the one or more characters are input into an alpha-numeric input area for searching a database, wherein the alpha-numeric input area includes a plurality of characters;
searching the database based on the search entry; and
disabling input of at least one character from the plurality of characters, into the alpha-numeric input area, based on determining that no database entries match the search entry.

2. The method of claim 1, wherein the one or more characters are input into the alpha-numeric input area by selecting the one or more characters from the plurality of characters displayed on a user device.

3. The method of claim 2, wherein disabling input of at least one character from the plurality of characters, into the alpha-numeric input area, comprises disabling a selection of the at least one character.

4. The method of claim 1 further comprising indicating to a user that input of the at least one character from the plurality of characters, into the alpha-numeric input area, is disabled.

5. The method of claim 4, wherein the indicating comprises causing the at least one character to appear opaque and unselectable in the alpha-numeric input area.

6. The method of claim 1 further comprising:
matching the search entry with one or more database entries; and
generating for display a plurality of interactive results corresponding to the matched one or more database entries.

7. The method of claim 6, wherein the plurality of interactive results are generated for display if a number of the matched one or more database entries is determined to be less than a predetermined threshold.

8. The method of claim 6 further comprising enabling a user to perform an action on one of the plurality of interactive results.

9. The method of claim 8, wherein the action comprises storing a media asset associated with the one of the plurality of interactive results.

10. The method of claim 8, wherein the action comprises viewing a media asset associated with the one of the plurality of interactive results.

11. A system for searching media comprising control circuitry configured to:
receive, from an input device, a search entry comprising one or more characters, wherein the one or more characters are input into an alpha-numeric input area for searching a database, wherein the alpha-numeric input area includes a plurality of characters;
search the database based on the search entry; and
disable input of at least one character from the plurality of characters, into the alpha-numeric input area, based on determining that no database entries match the search entry.

12. The system of claim 11, wherein the one or more characters are input into the alpha-numeric input area by selecting the one or more characters from the plurality of characters displayed on a user device.

13. The system of claim 12, wherein to disable input of at least one character from the plurality of characters, into the alpha-numeric input area, comprises disabling a selection of the at least one character.

14. The system of claim 11 wherein the control circuitry is further configured to indicate to a user that input of the at least one character from the plurality of characters, into the alpha-numeric input area, is disabled.

15. The system of claim 14, wherein to indicate comprises causing the at least one character to appear opaque and unselectable in the alpha-numeric input area.

16. The system of claim 11 wherein the control circuitry is further configured to:
match the search entry with one or more database entries; and
generate for display a plurality of interactive results corresponding to the matched one or more database entries.

17. The system of claim 16, wherein the plurality of interactive results are generated for display if a number of the matched one or more database entries is determined to be less than a predetermined threshold.

18. The system of claim 16 wherein the control circuitry is further configured to enable a user to perform an action on one of the plurality of interactive results.

19. The system of claim 18, wherein the action comprises storing a media asset associated with the one of the plurality of interactive results.

20. The system of claim 18, wherein the action comprises viewing a media asset associated with the one of the plurality of interactive results.

* * * * *